(12) United States Patent
Kang et al.

(10) Patent No.: US 12,069,285 B2
(45) Date of Patent: Aug. 20, 2024

(54) METHOD FOR CONSTRAINING AN IN-LOOP FILTER ON A 360-DEGREE VIDEO VIRTUAL EDGE

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 127 days.

(21) Appl. No.: 17/704,778

(22) Filed: Mar. 25, 2022

(65) Prior Publication Data
US 2022/0217396 A1     Jul. 7, 2022

Related U.S. Application Data

(63) Continuation of application No. PCT/KR2020/013146, filed on Sep. 25, 2020.

(30) Foreign Application Priority Data

Sep. 26, 2019  (KR) .................. 10-2019-0118887
Sep. 25, 2020  (KR) .................. 10-2020-0124875

(51) Int. Cl.
*H04N 19/46*     (2014.01)
*H04N 19/117*    (2014.01)
(Continued)

(52) U.S. Cl.
CPC ........... *H04N 19/46* (2014.11); *H04N 19/117* (2014.11); *H04N 19/13* (2014.11); *H04N 19/132* (2014.11);
(Continued)

(58) Field of Classification Search
CPC .... H04N 19/176; H04N 19/117; H04N 19/70; H04N 19/82; H04N 19/186;
(Continued)

(56) References Cited

U.S. PATENT DOCUMENTS

2018/0084257 A1    3/2018  Abbas
2019/0089961 A1    3/2019  Ahn et al.
(Continued)

FOREIGN PATENT DOCUMENTS

KR   20190053256 A    5/2019
WO     2017164645 A2   9/2017

OTHER PUBLICATIONS

Tsai et al. "Adaptive Loop Filtering for Video Coding" IEEE, Jul. 4, 2013, 12 Pages. (Year: 2013).*
(Continued)

*Primary Examiner* — Nathnael Aynalem
(74) *Attorney, Agent, or Firm* — Lempia Summerfield Katz LLC

(57) ABSTRACT

Disclosed is a method for signaling virtual boundary information and constraining an operation of an in-loop filter on a virtual boundary by using the signaled boundary information in order to prevent performance deterioration which may occur when applying the in-loop filter for a discontinuous boundary (or virtual boundary) depending on frame packing in an encoding/decoding of a 360-degree omnidirectional video.

16 Claims, 13 Drawing Sheets

(51) Int. Cl.
*H04N 19/13* (2014.01)
*H04N 19/132* (2014.01)
*H04N 19/167* (2014.01)
*H04N 19/172* (2014.01)
*H04N 19/597* (2014.01)
*H04N 19/82* (2014.01)

(52) U.S. Cl.
CPC ......... *H04N 19/167* (2014.11); *H04N 19/172* (2014.11); *H04N 19/597* (2014.11); *H04N 19/82* (2014.11)

(58) Field of Classification Search
CPC .... H04N 19/132; H04N 19/174; H04N 19/96; H04N 19/182; H04N 19/46; H04N 19/119; H04N 19/86; H04N 19/172; H04N 19/159; H04N 19/105; H04N 19/167; H04N 19/124; H04N 19/597; H04N 19/136; H04N 19/59; H04N 19/14; H04N 19/13; H04N 19/134; H04N 19/593; H04N 19/103; H04N 19/12; H04N 19/157; H04N 19/91; H04N 19/122; H04N 19/137; H04N 19/30; H04N 19/563; H04N 19/577; H04N 19/61; H04N 19/463; H04N 19/80; H04N 19/107; H04N 19/188; H04N 19/1883; H04N 19/436; H04N 19/60; H04N 19/11; H04N 19/127; H04N 19/129; H04N 19/156; H04N 19/423; H04N 19/426; H04N 19/51; H04N 19/98; H04N 19/52; H04N 19/42; H04N 19/44; H04N 19/50
USPC ....................................... 375/240.01–240.29
See application file for complete search history.

(56) References Cited

U.S. PATENT DOCUMENTS

| | | |
|---|---|---|
| 2019/0230285 A1 | 7/2019 | Kim |
| 2020/0404338 A1* | 12/2020 | Choi .................... H04N 19/176 |
| 2022/0191484 A1* | 6/2022 | Deng .................... H04N 19/159 |
| 2022/0217407 A1* | 7/2022 | Bang .................... H04N 19/167 |

OTHER PUBLICATIONS

Bross, Benjamin et al.; "Versatile Video Coding (Draft 6)"; Joint Video Experts Team (JVET) of ITU-T SG 16 WP 3 and ISO/IEC JTC 1/SC 29/WG 11; 15th Meeting: Gothenburg, SE; Jul. 3-12, 2019 (457 pages).

Chen, Jianle et al. "Algorithm description for Versatile Video Coding and Test Model 6 (VTM 6)"; Joint Video Experts Team (JVET) of ITU-T SG 16 WP 3 and ISO/IEC JTC 1/SC 29/WG 11; 15th Meeting: Gothenburg, SE; Jul. 3-12, 2019 (89 pages).

\* cited by examiner

METHOD FOR CONSTRAINING AN IN-LOOP FILTER ON A 360-DEGREE VIDEO VIRTUAL EDGE

CROSS-REFERENCE TO RELATED APPLICATIONS

This application is a continuation of International Application No. PCT/KR2020/013146, filed on Sep. 25, 2020, which claims priority to and the benefit of Korean Patent Application No. 10-2019-0118887, filed on Sep. 26, 2019, and Korean Patent Application No. 10-2020-0124875, filed on Sep. 25, 2020, the entire contents of each of which are incorporated herein by reference.

TECHNICAL FIELD

The present disclosure relates to a method for constraining an in-loop filter in a virtual edge of a 360-degree video. More particularly, the present disclosure relates to a method for constraining an in-loop filter on virtual boundaries in order to prevent performance deterioration which may occur when applying an in-loop filter for a virtual boundary depending on frame packing in an encoding/decoding method for a 360-degree omnidirectional video.

BACKGROUND

The statements in this section merely provide background information related to the present disclosure and may not constitute prior art.

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and applications such as a 360-degree omnidirectional video, a high dynamic range (HDR) video, etc., are expanding, and accordingly the amount of data to be encoded is increasing. Therefore, a new compression technology having better encoding efficiency and higher image quality enhancement effect than an existing compression technology is required.

SUMMARY

The present disclosure provides a method for signaling virtual boundary information and constraining an operation of an in-loop filter on a virtual boundary by using the signaled boundary information in order to prevent performance deterioration which may occur when applying an in-loop filter for a discontinuous boundary (or virtual boundary) depending on frame packing in an encoding/decoding method for a 360-degree omnidirectional video.

In accordance with one aspect of the present disclosure, a method is provided for processing a virtual boundary which is present in one or more pictures, which is performed by a video decoding apparatus. The method includes: decoding virtual boundary information including a uniform spacing flag and the number of virtual boundaries from a bitstream, wherein the uniform spacing flag includes a vertical uniform spacing flag and a horizontal uniform spacing flag, and the virtual boundaries include a vertical virtual boundary and a horizontal virtual boundary; decoding differential positional information of the virtual boundaries from the bitstream based on the uniform spacing flag; and determining positions of vertical virtual boundaries and positions of horizontal virtual boundaries by using the virtual boundary information or the differential positional information.

In accordance with another aspect of the present disclosure, the method further includes: decoding, from the bitstream, an in-loop filter constraint flag indicating whether to constrain in-loop filtering for the virtual boundaries within the one or more pictures. The virtual boundary information is decoded from the bitstream when the in-loop filter constraint flag indicates that the in-loop filtering is constrained.

In accordance with another aspect of the present disclosure, the method further includes: constraining, for reconstructed samples on the positions of the virtual boundaries, the in-loop filtering including at least one of deblocking filtering, sample adaptive offset (SAO) filtering, and adaptive loop filtering (ALF) when the in-loop filter constraint flag indicates that the in-loop filtering is constrained.

In accordance with another aspect of the present disclosure, a video decoding apparatus is provided. The apparatus includes an entropy decoder, an adder and a loop filter unit. The entropy decoder is configured to decode virtual boundary information including a uniform spacing flag and the number of virtual boundaries which are present in one or more pictures from a bitstream, decode, from the bitstream, differential positional information of the virtual boundaries based on the uniform spacing flag, and decode, from the bitstream, residual signals for samples constituting the picture. Herein, the uniform spacing flag includes a vertical uniform spacing flag and a horizontal uniform spacing flag, and the virtual boundaries includes a vertical virtual boundary and a horizontal virtual boundary. The adder is configured to reconstruct the samples by using residual samples generated from the residual signals and prediction samples for the samples. The loop filter unit is configured to determine positions of vertical virtual boundaries and positions of horizontal virtual boundaries by using the virtual boundary information or the differential positional information of the virtual boundaries.

According to the present embodiment as described above, the performance deterioration is prevented which may occur when applying the in-loop filter to the virtual boundary, by signaling the virtual boundary information depending on the frame packing and constraining the operation of the in-loop filter on the virtual boundary using the boundary information

DETAILED DESCRIPTION

Figure 1:
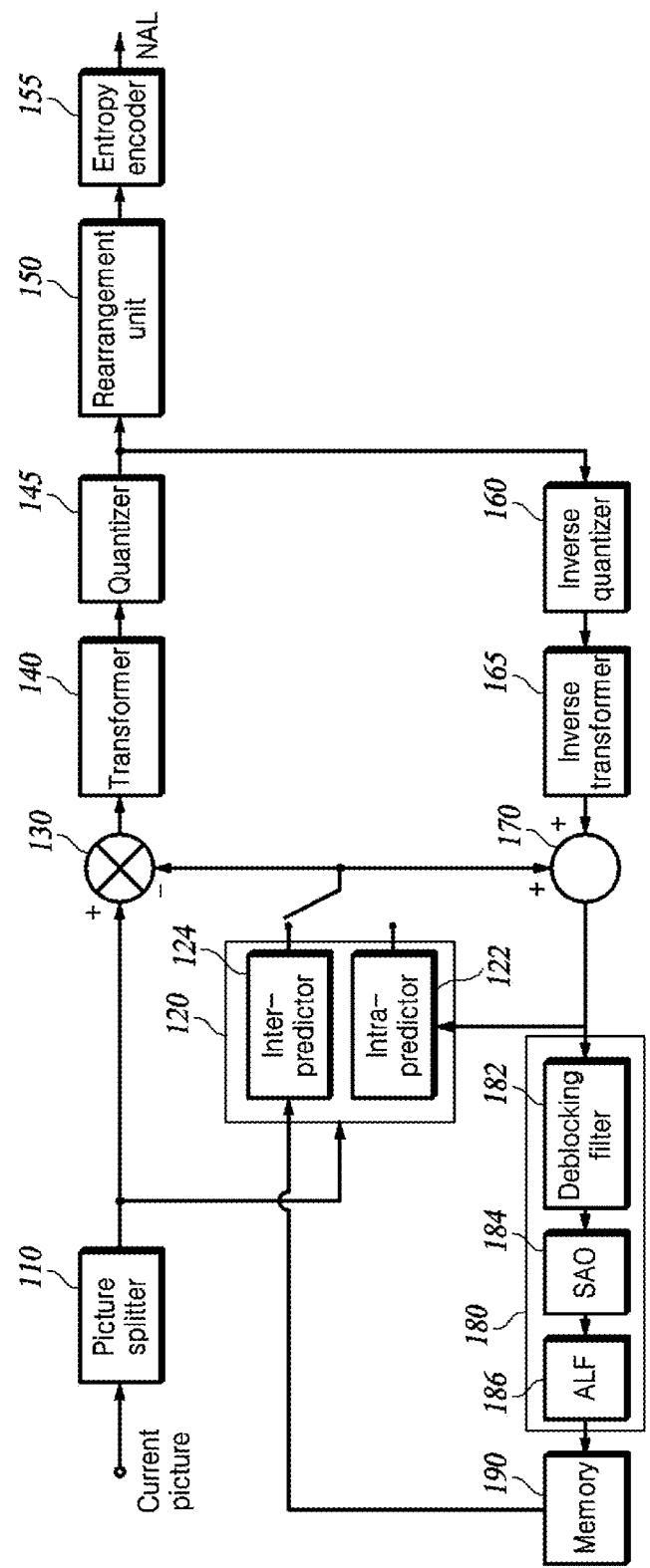
FIG. 1 is an exemplary block diagram for a video encoding apparatus which may implement technologies of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of embodiments of the present disclosure, a detailed description of known functions and configurations incorporated herein will be omitted to avoid obscuring the subject matter of the embodiments.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video is composed of one or more sequences including a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header. In addition, information referred to by one or more SPSs in common is encoded in a video parameter set (VPS). Furthermore, information which a plurality of pictures refers to in common is encoded in a sequence parameter set (SPS). In addition, information applied to one tile or tile group in common may be encoded as a syntax of a tile or tile group header. The syntaxes included in the SPS, PPS, slice header, and tile or tile group header may be referred to as high-level syntaxes.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size, and then recursively splits the CTUs using a tree structure. In the tree structure, a leaf node serves as a coding unit (CU), which is a basic unit of encoding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
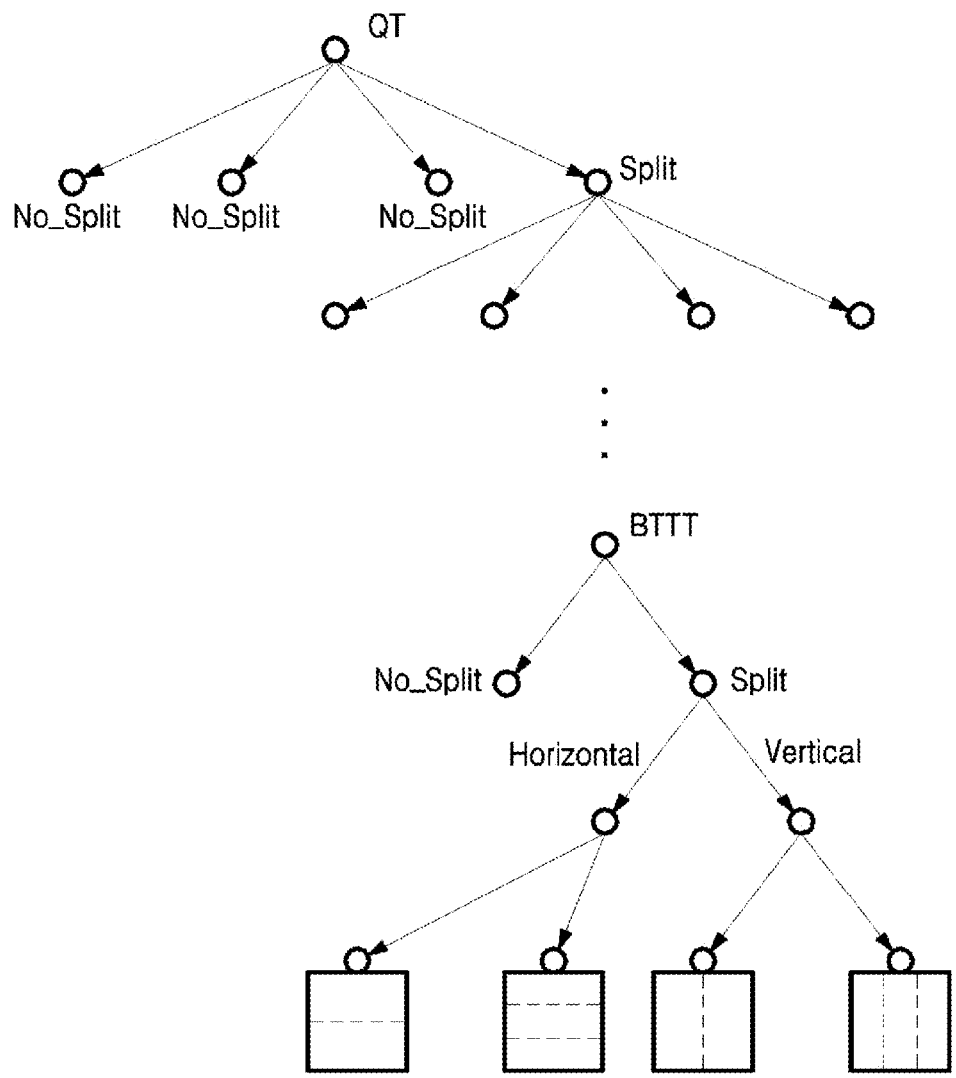
FIG. 2 is a diagram for describing a method for splitting a block by using a QTBTTT structure.

FIG. 2 is a diagram illustrating a method for splitting a block using a QTBTTT structure.

As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus.

Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

In general, each of the current blocks in a picture may be predictively coded. In general, prediction of a current block may be performed using an intra-prediction technique (which uses data from a picture containing the current block) or an inter-prediction technique (which uses data from a picture coded before the picture containing the current block). The inter-prediction includes both unidirectional prediction and bi-directional prediction.

Figure 3A:
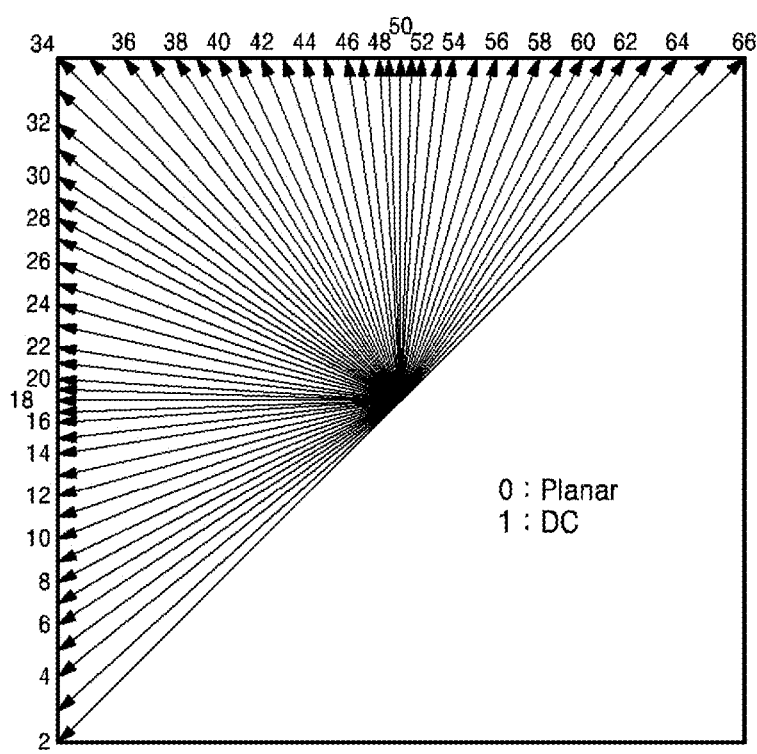
FIGS. 3A and 3B are diagrams illustrating a plurality of intra prediction modes including wide angle intra prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3A, the plurality of intra-prediction modes may include two non-directional modes, which include a planar mode and a DC mode, and 65 directional modes. Neighboring pixels and an equation to be used are defined differently for each prediction mode.

Figure 3B:
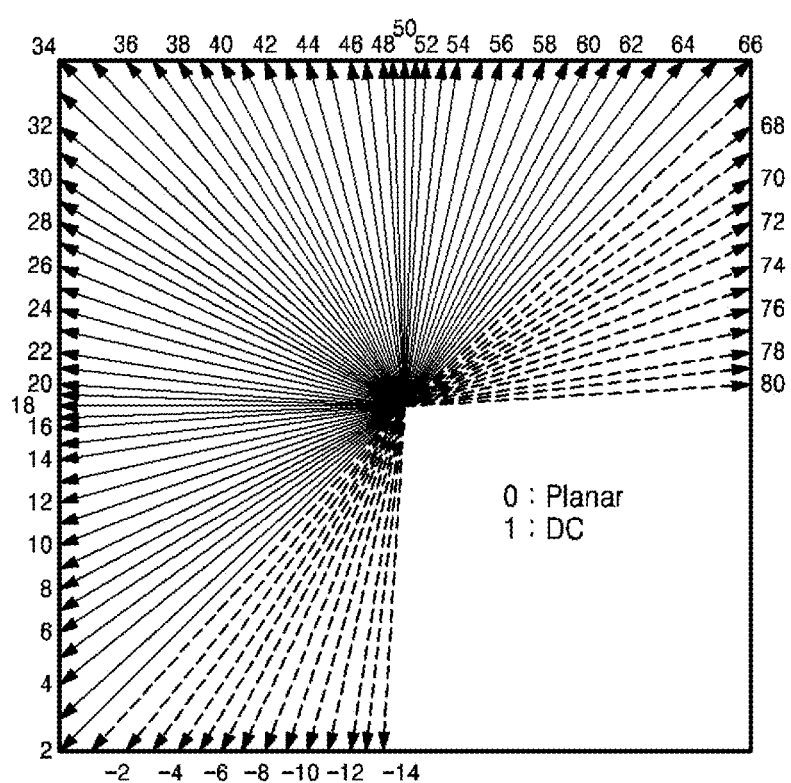

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of the width and height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with a width greater than the height thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture which has been encoded and decoded earlier than the current picture, and generates a prediction block for the current block using the searched block. Then, the inter-predictor generates a motion vector (MV) corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The inter-predictor 124 may perform interpolation on a reference picture or a reference block in order to increase prediction accuracy. That is, subsamples between two consecutive integer samples are interpolated by applying filter coefficients to a plurality of consecutive integer samples including the two integer samples. When the operation of searching for a block most similar to the current block is performed on the interpolated reference picture, the motion vector may be expressed at a precision level of fractional sample unit, not a precision level of integer sample unit. The precision or resolution of the motion vector may be set differently for each target region to be encoded, for example, each unit such as a slice, tile, CTU, or CU. When such an adaptive motion vector resolution (AMVR) is applied, information about motion vector resolution to be applied to each target region should be signaled for each target region. For example, when the target region is a CU, information about the motion vector resolution applied to each CU is signaled. The information about the motion vector resolution may be information indicating the precision of a motion vector difference which will be described later.

The inter-predictor 124 may perform inter-prediction using bi-prediction. In bi-directional prediction, the inter-predictor 124 uses two reference pictures and two motion vectors representing block positions most similar to the current block in the respective reference pictures. The inter-predictor 124 selects a first reference picture and a second reference picture from reference picture list 0 (RefPicList0) and reference picture list 1 (RefPicList1), respectively, searches for blocks similar to the current block in the respective reference pictures, and generate a first reference block and a second reference block. Then, it generates a prediction block for the current block by averaging or weighting the first reference block and the second reference block. Then, it transfers motion information including information about the two reference pictures and the two motion vectors used to predict the current block to the encoder 120.

Here, RefPicList0 may be composed of pictures preceding the current picture in display order among the reconstructed pictures, and RefPicList1 may be composed of pictures following the current picture in display order among the reconstructed pictures. However, embodiments are not limited thereto. Pre-reconstructed pictures following the current picture in display order may be further included in RefPicList0, and conversely, and pre-reconstructed pictures preceding the current picture may be further included in RefPicList1.

Various methods may be used to minimize the number of bits required to encode the motion information.

For example, when the reference picture and motion vector of the current block are the same as the reference picture and motion vector of a neighboring block, the motion information about the current block may be transmitted to the video decoding apparatus by encoding information for identifying the neighboring block. This method is called a "merge mode."

In the merge mode, the inter-predictor 124 selects a predetermined number of merge candidate blocks (hereinafter referred to as "merge candidates") from among the neighboring blocks of the current block.

Figure 4:
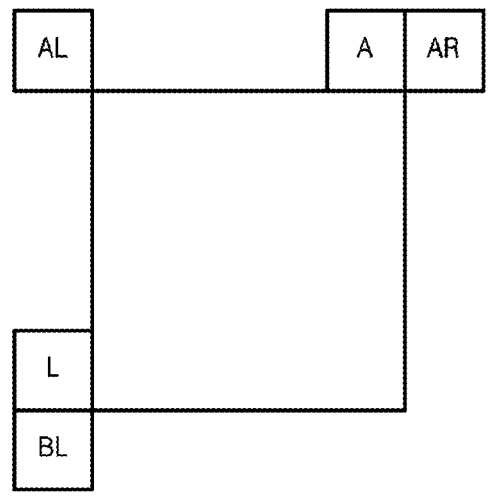
FIG. 4 is an exemplary diagram for a neighboring block of a current block.

As illustrated in FIG. 4, all or part of a left block L, an above block A, an above right block AR, a bottom left block BL, and an above left block AL, which are adjacent to the current block in the current picture, may be used as neighboring blocks for deriving merge candidates. In addition, a block located within a reference picture (which may be the same as or different from the reference picture used to predict the current block) other than the current picture in which the current block is located may be used as a merge candidate. For example, a co-located block which is at the same position as the current block or blocks adjacent to the co-located block in the reference picture may be additionally used as merge candidates.

The inter-predictor 124 configures a merge list including a predetermined number of merge candidates using such neighboring blocks. The inter-predictor 124 selects a merge candidate to be used as the motion information about the current block from among the merge candidates included in the merge list, and generates merge index information for identifying the selected candidates. The generated merge index information is encoded by the encoder 155 and transmitted to the video decoding apparatus.

Another method of encoding the motion information is an advanced motion vector prediction (AMVP) mode.

In the AMVP mode, the inter-predictor 124 derives predicted motion vector candidates for the motion vector of the current block by using neighboring blocks of the current block. All or part of the left block L, the above block A, the above right block AR, the bottom left block BL, and the above left block AL, which are adjacent to the current block in the current picture in FIG. 2, may be used as the neighboring blocks used to derive the predicted motion vector candidates. In addition, a block positioned within a reference picture (which may be the same as or different from the reference picture used to predict the current block) other than the current picture including the current block may be used as the neighboring blocks used to derive the predicted motion vector candidates. For example, a co-located block which is at the same position as the current block or blocks adjacent to the collocated block in the reference picture may be used.

The inter-predictor 124 derives predicted motion vector candidates using the motion vectors of the neighboring blocks, and determines a predicted motion vector for the motion vector of the current block using the predicted motion vector candidates. Then, a motion vector difference is calculated by subtracting the predicted motion vector from the motion vector of the current block.

The predicted motion vector may be obtained by applying a predefined function (e.g., a function for calculating a median, an average, or the like) to the predicted motion vector candidates. In this case, the video decoding apparatus also knows the predefined function. Since the neighboring blocks used to derive the predicted motion vector candidates have already been encoded and decoded, the video decoding apparatus already knows the motion vectors of the neighboring blocks as well. Accordingly, the video encoding apparatus does not need to encode information for identifying the predicted motion vector candidates. Therefore, in this case, the information about the motion vector difference and the information about the reference picture used to predict the current block are encoded.

The predicted motion vector may be determined by selecting any one of the predicted motion vector candidates. In this case, information for identifying the selected predicted motion vector candidate is further encoded along with the information about the motion vector difference and the information about the reference picture which are to be used to predict the current block.

The subtractor 130 subtracts the prediction block generated by the intra-predictor 122 or the inter-predictor 124 from the current block to generate a residual block.

The transformer 140 transforms the residual signal in the residual block having pixel values in the spatial domain into transform coefficients in the frequency domain. The transformer 140 may transform residual signals in the residual block using the entire size of the residual block as a transformation unit. Alternatively, it may split the residual block into a plurality of subblocks, and perform the transformation using the subblock as a transform unit. Alternatively, the residual signals may be transformed by dividing the block into two subblocks, which are a transform region and a non-transform region, and using only the transform region subblock as a transform unit. Here, the transform region subblock may be one of two rectangular blocks having a size ratio of 1:1 based on the horizontal axis (or vertical axis). In this case, a flag (cu_sbt_flag) indicating that only subblocks have been transformed, directionality (vertical/horizontal) information (cu_sbt_horizontal_flag) and/or position information (cu_sbt_pos_flag) are encoded by the entropy encoder 155 and signaled to the video decoding apparatus. In addition, the size of the transform region subblock may have a size ratio of 1:3 based on the horizontal axis (or vertical axis). In this case, a flag (cu_sbt_quad_flag) distinguishing the corresponding splitting is additionally encoded by the entropy encoder 155 and signaled to the video decoding apparatus.

The transformer 140 may transform the residual block in the horizontal direction and the vertical direction individually. For transformation, various types of transform functions or transform matrices may be used. For example, pairs of transform functions for horizontal transformation and vertical transformation may be defined as a multiple transform set (MTS). The transformer 140 may select one pair of transform functions having the best transformation efficiency in the MTS, and transform the residual block in the horizontal and vertical directions, respectively. The information (mts_idx) on the transform function pair selected in the MTS is encoded by the entropy encoder 155 and signaled to the video decoding apparatus.

The quantizer 145 quantizes transform coefficients output from the transformer 140 using quantization parameters, and outputs the quantized transform coefficients to the entropy encoder 155. For some blocks or frames, the quantizer 145 may directly quantize a related residual block without transformation. The quantizer 145 may apply different quantization coefficients (scaling values) according to the positions of the transform coefficients in a transform block. A matrix of quantized coefficients applied to the two-dimensionally arranged quantized transform coefficients may be encoded and signaled to the video decoding apparatus.

The rearrangement unit 150 may re-sort the coefficient values for the quantized residual value.

The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 encodes the one-dimensional quantized transform coefficients output from the rearrangement unit 150 using uses various encoding techniques such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (a merge index for the merge mode, information about a reference picture index and a motion vector difference for the AMVP mode) according to the prediction type. The entropy encoder 155 also encodes information related to quantization, that is, information about quantization parameters and information about a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The loop filter unit 180 performs filtering for the reconstructed pixels in order to reduce blocking artifacts, ringing artifacts, blurring artifacts, etc., which occur due to block based prediction and transform/quantization. The filter unit 180 as an in-loop filter may include all or some of a deblocking filter 182, a sample adaptive offset (SAO) filter 184, and an adaptive loop filter (ALF) 186.

The deblocking filter 182 filters the boundary between the reconstructed blocks to remove blocking artifacts caused by block-by-block coding/decoding, and the SAO filter 184 and the ALF 186 performs additional filtering on the deblocking-filtered video. The SAO filter 184 and the ALF 186 are filters used to compensate for a difference between a reconstructed sample and an original sample caused by lossy coding. The SAO filter 184 applies offsets on a CTU basis to enhance subjective image quality and encoding efficiency. Contrary to this, the ALF 184 performs block-by-block based filtering, and compensates distortion by applying different filters through classifying an edge of the corresponding block and a degree of a change amount. Information on filter coefficients to be used for the ALF may be encoded, and signaled to the video decoding apparatus.

The reconstructed block filtered through the deblocking filter 182, the SAO filter 184, and the ALF 184 is stored in the memory 190. When all blocks in one picture are reconstructed, the reconstructed picture may be used as a reference picture for inter-prediction of blocks in a picture to be encoded next.

Figure 5:
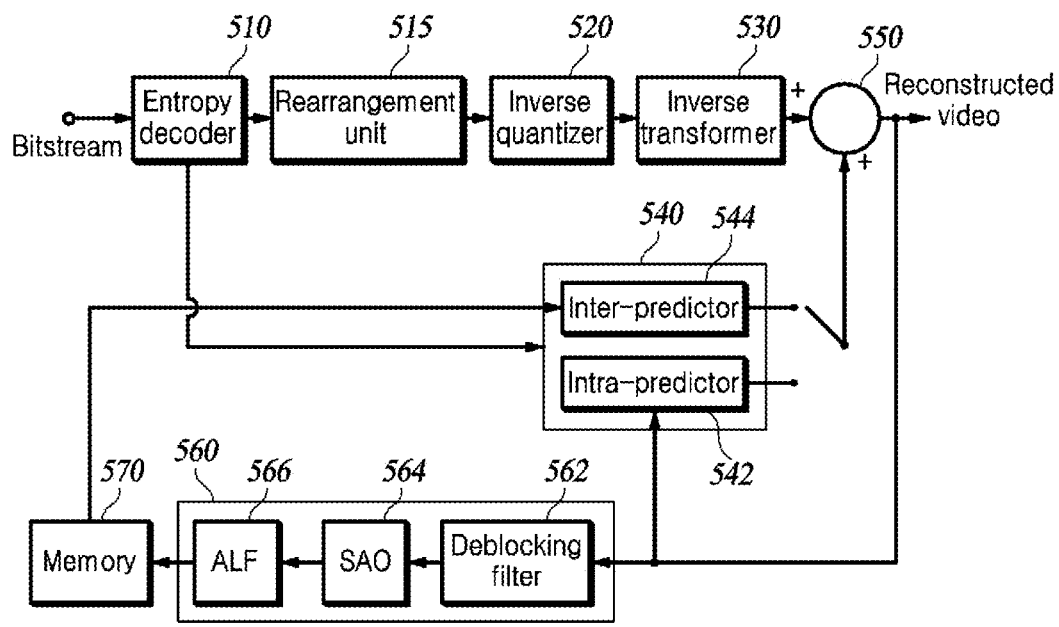
FIG. 5 is an exemplary block diagram for a video decoding apparatus which may implement the technologies of the present disclosure.

FIG. 5 is an exemplary functional block diagram of a video decoding apparatus capable of implementing the techniques of the present disclosure. Hereinafter, the video decoding apparatus and elements of the apparatus will be described with reference to FIG. 5.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 510 determines a current block to be decoded by decoding a bitstream generated by the video encoding apparatus and extracting information related to block splitting, and extracts prediction information and information about a residual signal, and the like required to reconstruct the current block.

The entropy decoder 510 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 510 extracts information about a prediction type indicating whether the current block is intra-predicted or inter-predicted. When the prediction type information indicates intra-prediction, the entropy decoder 510 extracts a syntax element for the intra-prediction information (intra-prediction mode) for the current block. When the prediction type information indicates inter-prediction, the entropy decoder 510 extracts a syntax element for the inter-prediction information, that is, information indicating a motion vector and a reference picture referred to by the motion vector.

The entropy decoder 510 also extracts information about quantized transform coefficients of the current block as information related to quantization and information about residual signals.

The rearrangement unit 515 may change the sequence of the one-dimensional quantized transform coefficients entropy-decoded by the entropy decoder 510 to a 2-dimensional coefficient array (i.e., block) in a reverse order of the coefficient scanning performed by the video encoding apparatus.

The inverse quantizer 520 inversely quantizes the quantized transform coefficients, and inversely quantizes transform coefficients quantized using the quantization parameter. The inverse quantizer 520 may apply different quantization coefficients (scaling values) to the quantized transform coefficients arranged in two dimensions. The inverse quantizer 520 may perform inverse quantization by applying a matrix of quantization coefficients (scaling values) from the video encoding apparatus to a two-dimensional array of quantized transform coefficients.

The inverse transformer 530 inversely transforms the inversely quantized transform coefficients from the frequency domain to the spatial domain to reconstruct residual signals, thereby generating a residual block for the current block.

In addition, when the inverse transformer 530 inversely transforms only a partial region (subblock) of the transform block, it extracts a flag (cu_sbt_flag) indicating that only the subblock of the transform block has been transformed, the directionality (vertical/horizontal) information about the subblock (cu_sbt_horizontal_flag), and/or position information about the subblock (cu_sbt_pos_flag), and inversely transforms the transform coefficients of the subblock from the frequency domain to the spatial domain. Then, it reconstructs residual signals, and fills a region that is not inversely transformed with the value of "0" as a residual block, thereby generating the final residual block for the current block.

In addition, when the MTS is applied, the inverse transformer 530 determines transform functions or transform matrices to be applied in the horizontal and vertical directions, respectively, using the MTS information (mts_idx) signaled from the video encoding apparatus, and uses the determined transform functions to inversely transform the transform coefficients in the transform block in the horizontal and vertical directions.

The predictor 540 may include an intra-predictor 542 and an inter-predictor 544. The intra-predictor 542 is activated when the prediction type of the current block is intra-prediction, and the inter-predictor 544 is activated when the prediction type of the current block is inter-prediction.

The intra-predictor 542 determines an intra-prediction mode of the current block among a plurality of intra-prediction modes based on the syntax element for the intra-prediction mode extracted from the entropy decoder 510, and predicts the current block using the reference pixels around the current block according to the intra-prediction mode.

The inter-predictor 544 determines a motion vector of the current block and a reference picture referred to by the motion vector using the syntax element for the intra-prediction mode extracted from the entropy decoder 510, and predicts the current block based on the motion vector and the reference picture.

The adder 550 reconstructs the current block by adding the residual block output from the inverse transformer 530 and the prediction block output from the inter-predictor 544 or the intra-predictor 542. The pixels in the reconstructed current block are used as reference pixels in intra-predicting a block to be decoded next.

The loop filter unit 560 as an in-loop filter may include a deblocking filter 562, an SAO filter 564, and an ALF 566. The deblocking filter 562 deblocking-filters the boundary between the reconstructed blocks to remove blocking artifacts caused by block-by-block decoding. The SAO filter 564 and the ALF (566) performs additional filtering on the reconstructed block after deblocking filtering to compensate for a difference between the reconstructed pixel and the original pixel caused by lossy coding. The filter coefficients of the ALF are determined based on the information about the filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter-predicting blocks in a picture to be encoded afterwards.

A 360-degree video as a video acquiring an omnidirectional scene may be formed by various projection formats. As a representative example, there are equi-rectangular projection (ERP) and cube map projection (CMP) formats.

Figure 6:
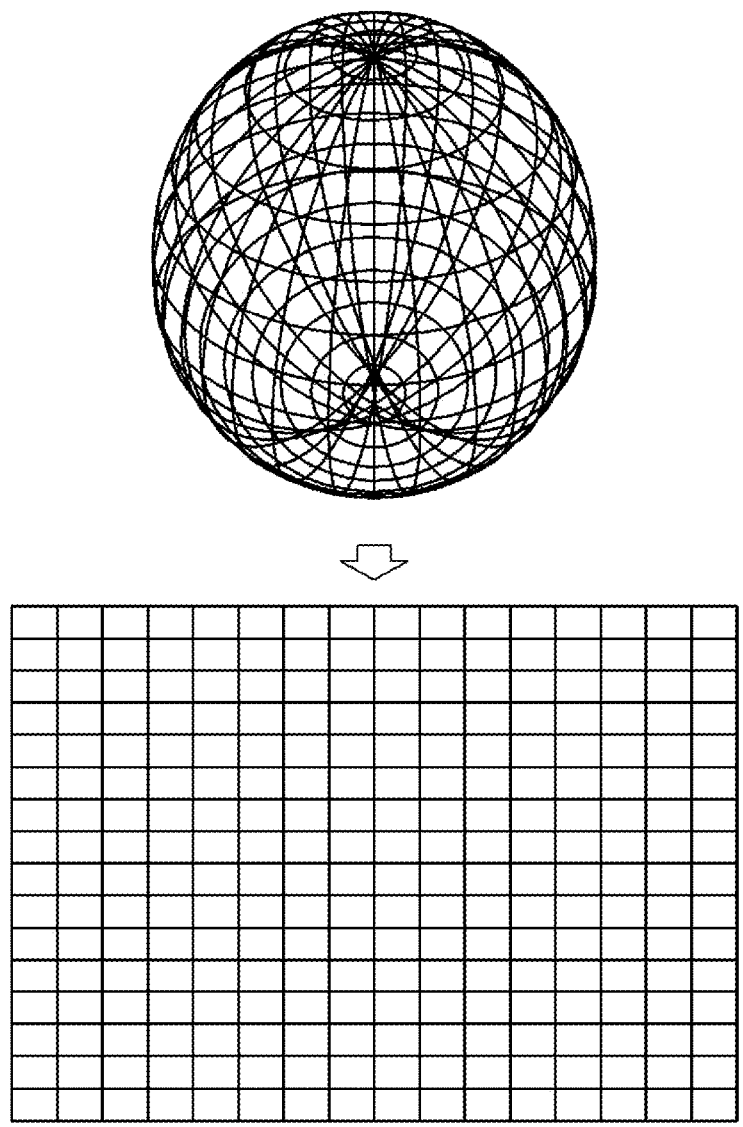
FIG. 6 is an exemplary diagram illustrating an EPR format which is a projection format for a 360-degree video.

FIG. 6 is an exemplary diagram illustrating an EPR format which is a projection format for a 360-degree video.

In the ERP format, a video mapped to a 360-degree sphere based on a camera is projected in a 2D format. The video is expanded horizontally by 1/cos φ (here, φ is latitude) when moving vertically based on an equator differently from a feature of a general video.

Figure 7:
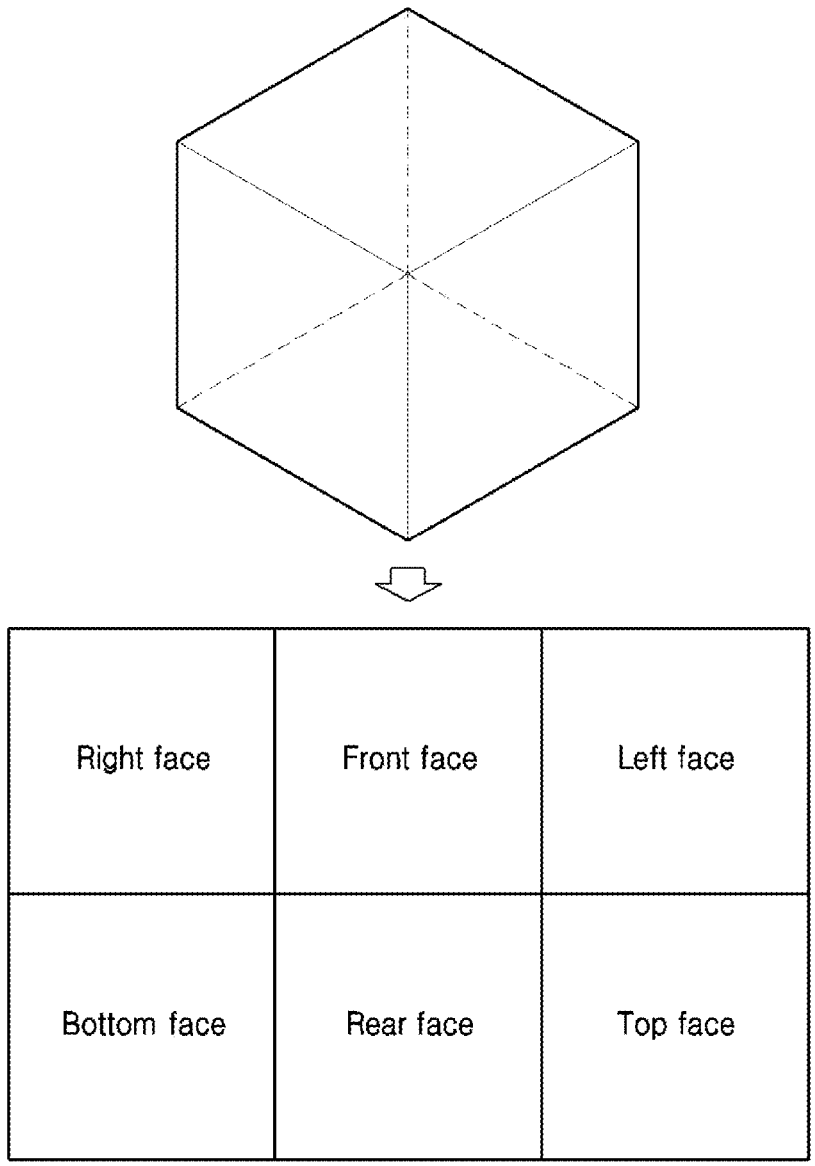
FIG. 7 is an exemplary diagram illustrating a CMP format which is the projection format for the 360-degree video.

FIG. 7 is an exemplary diagram illustrating a CMP format which is the projection format for the 360-degree video.

In the CMP format, a video mapped to a hexahedron based on the camera is projected in the 2D format. Each view constituting the hexahedron is arrayed as a 2D video such as 1×6, 2×3, etc., and compressed and transmitted. Such an array process is expressed as frame packing, and as illustrated in Table 1, a scheme for frame packing of 1×6, 2×3, 3×2, and 6×1 may be used. In order to represent a position of a packed frame, position indexes of 0 to 5 may be assigned.

TABLE 1

| cmp_packing_type | packing_type & position_index |
|---|---|
| 0 | 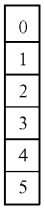 |
| 1 |  |
| 2 | 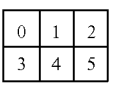 |
| 3 | 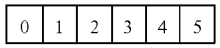 |

When the projection format constituted by one or more faces such as the CMP is used, the 360-degree video may be transformed into the 2D format by using the frame packing. However, even though any frame packing is used, a discontinuous boundary may be shown between contiguous faces. In the case of the CMP illustrated in FIG. 7, faces corresponding to a right face, a front face, and a left face, which are placed on the first row of the 2D format, are continuously packed with each other, and faces of a lower face, a rear face, and a top face, which are placed on the second row of the 2D format are also continuously packed with each other, but discontinuity may be present between the top and the bottom.

For reference, various types of projection formats including the ERP and the CMP are illustrated in Table 2.

TABLE 2

| Index | Projection format |
|---|---|
| 0 | Equirectangular (ERP) |
| 1 | Cubemap (CMP) |
| 2 | Adjusted Equal-area (AEP) |
| 3 | Octahedron (OHP) |
| 4 | Viewport generation using rectilinear projection |
| 5 | Icosahedron (ISP) |
| 6 | Crasters Parabolic Projection for CPP-PSNR calculation |
| 7 | Truncated Square Pyramid(TSP) |
| 8 | Segmented Sphere Projection (SSP) |
| 9 | Adjusted Cubemap Projection (ACP) |
| 10 | Rotated Sphere Projection (RSP) |
| 11 | Equi-angular Cubemap Projection (EAC) |
| 12 | Equatorial Cylindrical Projection (ECP) |

When the in-loop filter is applied to the boundary depending on the frame packing, pixels crossing a discontinuous boundary or a virtual boundary are jointly filtered, and as a result, subjective/objective performance may deteriorate.

The present embodiment discloses a method for constraining the in-loop filter for a 360-degree video virtual boundary at the video decoding apparatus. More specifically, for the purpose of preventing performance deterioration which may occur when applying the in-loop filter for the virtual boundary depending on the frame packing in encoding or decoding the 360-degree omnidirectional video, the present disclosure provides a method for signaling a virtual boundary information at the video encoding apparatus and constraining an operation of the in-loop filter on the virtual boundary by using the signaled virtual boundary information.

The loop filter unit 180 of the video encoding apparatus according to the present disclosure serves as the in-loop filter and may include the deblocking filter 182, the SAO filter 184, and the ALF 186. Further, the loop filter unit 560 of the video decoding apparatus according to the present disclosure serves as the in-loop filter and may include the deblocking filter 562, the SAO filter 564, and the ALF 566.

In order to constrain the operation of the in-loop filter on the virtual boundary, the video encoding apparatus signals the virtual boundary information at a level of the SPS or the PPS. The virtual boundary information includes an in-loop filter constraint flag, number and positional information of a vertical virtual boundary, and number and positional information of a horizontal virtual boundary. Table 3 illustrates an example for virtual boundary information which the video encoding apparatus signals at the level of the PPS.

TABLE 3

```
pic_parameter_set_rbsp( ) {
  ...
  pps_loop_filter_across_virtual_boundaries_disabled_flag
  if( pps_loop_filter_across_virtual_boundaries_disabled_flag ) {
    pps_num_ver_virtual_boundaries
    for( i = 0; i < pps_num_ver_virtual_boundaries; i++ )
      pps_virtual_boundaries_pos_x[ i ]
    pps_num_hor_virtual_boundaries
    for( i = 0; i < pps_num_hor_virtual_boundaries; i++ )
      pps_virtual_boundaries_pos_y[ i ]
  }
  ...
}
```

When the in-loop filter constraint flag pps_loop_filter_across_virtual_boundaries_disabled_flag is 1, the video decoding apparatus deactivates the in-loop filter on the virtual boundary within the frame or picture which refers to the PPS. On the contrary, when the in-loop filter constraint flag is 0, the video decoding apparatus may apply the in-loop filter on the virtual boundary. When the in-loop filter constraint flag is not signaled, the in-loop filter constraint flag may be set to 0.

pps_num_ver_virtual_boundaries specifies the number of vertical virtual boundaries and may be set in a range of 0 to 3, and set to 0 when not signaled. The positional information of the vertical virtual boundaries is expressed by using pps_virtual_boundaries_pos_x[i]. As illustrated in Table 3, when the in-loop filter constraint flag is 1, the number of vertical virtual boundaries and the positional information of the vertical virtual boundaries may be decoded.

The video decoding apparatus may calculate a position of an i-th vertical virtual boundary, PpsVirtualBoundariesPosX[i] as a unit of the luma sample by using the positional information of the vertical virtual boundaries. The position of the i-th vertical virtual boundary is derived as illustrated in Equation 1.

$$PpsVirtualBoundariesPosX[i]=pps\_virtual\_boundaries\_pos\_x[i] \times 8 \ i=0, \ldots , pps\_num\_ver\_virtual\_boundaries-1 \quad \text{[Equation 1]}$$

Here, a range of the position of the i-th vertical virtual boundary is from 1 to Ceil(pic_width_in_luma_samples/8)−1, and pic_width_in_luma_samples represents a width of the current picture expressed as the unit of the luma sample.

Meanwhile, pps_num_hor_virtual_boundaries specifies the number of horizontal virtual boundaries and may be set in the range of 0 to 3, and set to 0 when not signaled. The positional information of the horizontal virtual boundaries is expressed by using pps_virtual_boundaries_pos_y[i]. As illustrated in Table 3, when the in-loop filter constraint flag is 1, the number of horizontal virtual boundaries and the positional information of the horizontal virtual boundaries may be decoded.

The video decoding apparatus may calculate a position of an i-th horizontal virtual boundary, PpsVirtualBoundariesPosY[i] as a unit of the luma sample by using the positional information of the horizontal virtual boundaries. The position of the i-th horizontal virtual boundary is derived as illustrated in Equation 2.

$$PpsVirtualBoundariesPosY[i] = pps\_virtual\_boundaries\_pos\_y[i] \times 8 \quad i=0, \ldots, pps\_num\_hor\_virtual\_boundaries-1 \quad [\text{Equation 2}]$$

Here, a range of the position of the i-th horizontal virtual boundary is from 1 to Ceil(pic_height_in_luma_samples/8)−1, and pic_height_in_luma_samples represents a height of the current picture expressed as the unit of the luma sample.

pps_virtual_boundaries_pos_x[i] and pps_virtual_boundaries_pos_y[i] are expressed as positive integers of 0 or more by using 13 bits.

The video encoding apparatus may signal the virtual boundary information as described above at the level of the SPS as illustrated in Table 4.

TABLE 4

```
seq_parameter_set_rbsp( ) {
  ...
  sps_loop_filter_disabled_across_virtual_boundaries_flag
  if( sps_loop_filter_disabled_across_virtual_boundaries_flag) {
    sps_num_ver_virtual_boundaries
    for( i = 0; i < sps_num_ver_virtual_boundaries; i++ )
      sps_virtual_boundaries_pos_x[ i ]
    sps_num_hor_virtual_boundaries
    for( i = 0; i < sps_num_hor_virtual_boundaries; i++ )
      sps_virtual_boundaries_pos_y[ i ]
  }
  ...
}
```

The loop filter unit 560 of the video decoding apparatus according to the present disclosure checks a deactivation condition for the deblocking filter 562 before operating the deblocking filter 562 for the reconstructed block. For example, the deblocking filter 562 may be deactivated for the boundary of a picture.

When a horizontal coordinate of a target sample to be filtered coincides with one of the positions of the i-th vertical virtual boundary, PpsVirtualBoundariesPosX[i] while the in-loop filter constraint flag is 1, the loop filter unit 560 may constrain the operation of the deblocking filter 562 in the horizontal direction for the corresponding target sample. Further, when a vertical coordinate of a target sample to be filtered coincides with one of the positions of the i-th horizontal virtual boundary, PpsVirtualBoundariesPosY[i] while the in-loop filter constraint flag is 1, the loop filter unit 560 may constrain the operation of the deblocking filter 562 in the vertical direction for the corresponding target sample.

Meanwhile, the loop filter unit 560 checks the deactivation condition for the SAO filter 564 before operating the SAO filter 564 for the reconstructed block. For example, when an index indicating the type of the SAO filter is 0, the SAO filter 564 may be deactivated for all corresponding target samples.

There are two types of SAOs: one is a boundary offset (EO) and the other one is a band offset (BO). The video encoding apparatus selects and performs one of the EO and the BO for a target area, and delivers a syntax element indicating the SAO type to the video decoding apparatus. The video decoding apparatus determines whether to apply the SAO using the syntax element indicating the SAO type, and determines whether to apply the boundary offset or the band offset when applying the SAO. For example, the video decoding apparatus does not apply the SAO when the syntax element indicating the SAO type is 0, and applies the BO when the syntax element is 1, and applies the EO when the syntax element is 2. When the SAO type is the EO, the operation of the SAO filter may be constrained on the virtual boundary.

Four directions or classes such as horizontal, vertical, 135 degrees, and 45 degrees may be present in the EO, and each class may be determined based on a difference between the target sample and neighboring samples thereof. The video encoding apparatus signals which EO class is applied as a unit of the target block (e.g., CTU).

When the horizontal coordinate of the target sample to be filtered coincides with one of the positions of the i-th vertical virtual boundary (PpsVirtualBoundariesPosX[i]) or one precedent position (PpsVirtualBoundariesPosX[i]−1) while the in-loop filter constraint flag is 1, and when the class of the EO is not the vertical direction, the loop filter unit 560 may constrain the operation of the SAO filter 564 for the corresponding target sample.

Further, when a vertical coordinate of the target sample to be filtered coincides with one of the positions of the i-th horizontal virtual boundary (PpsVirtualBoundariesPosY[i]) or one precedent position (PpsVirtualBoundariesPosY[i]−1) while the in-loop filter constraint flag is 1, and when the class of the EO is not the horizontal direction, the loop filter unit 560 may constrain the operation of the SAO filter 564 for the corresponding target sample.

For a chroma sample, the loop filter unit 560 may constrain the operation of the SAO filter 564 by using a process similar to the process applied to the luma sample.

When a high-level ALF activation flag is 1, there is no particular condition in which the loop filter unit 560 deactivates the operation of the ALF 566 for the reconstructed block. However, when the boundary of the reconstructed block to be filtered coincides with the picture, tile, or slice boundary, the operation of the ALF 566 for the sample of the reconstructed block may be different depending on whether an external sample of the picture, tile, or slice including the reconstructed block is available. When the external sample is available, there is no constraint for the operation of the ALF 566. On the contrary, when it is not possible to use the external sample, the operation of the ALF 566 is performed by using only an internal sample of the picture, tile, or slice including the reconstructed block. In this case, a position requiring external sample information may be padded by using a neighboring internal sample in the process of operating the ALF 566.

The loop filter unit 560 selects one closest to the horizontal coordinate of the target sample to be filtered among the positions of the i-th vertical virtual boundaries, PpsVirtualBoundariesPosX[i] while the in-loop filter constraint flag is 1, and sets the selected position as an adjacent vertical virtual boundary. The loop filter unit 560 selects one closest to the vertical coordinate of the target sample to be filtered among the positions of the i-th horizontal virtual boundaries, PpsVirtualBoundariesPosY[i] while the in-loop filter constraint flag is 1, and sets the selected position as an adjacent horizontal virtual boundary.

Figure 8:
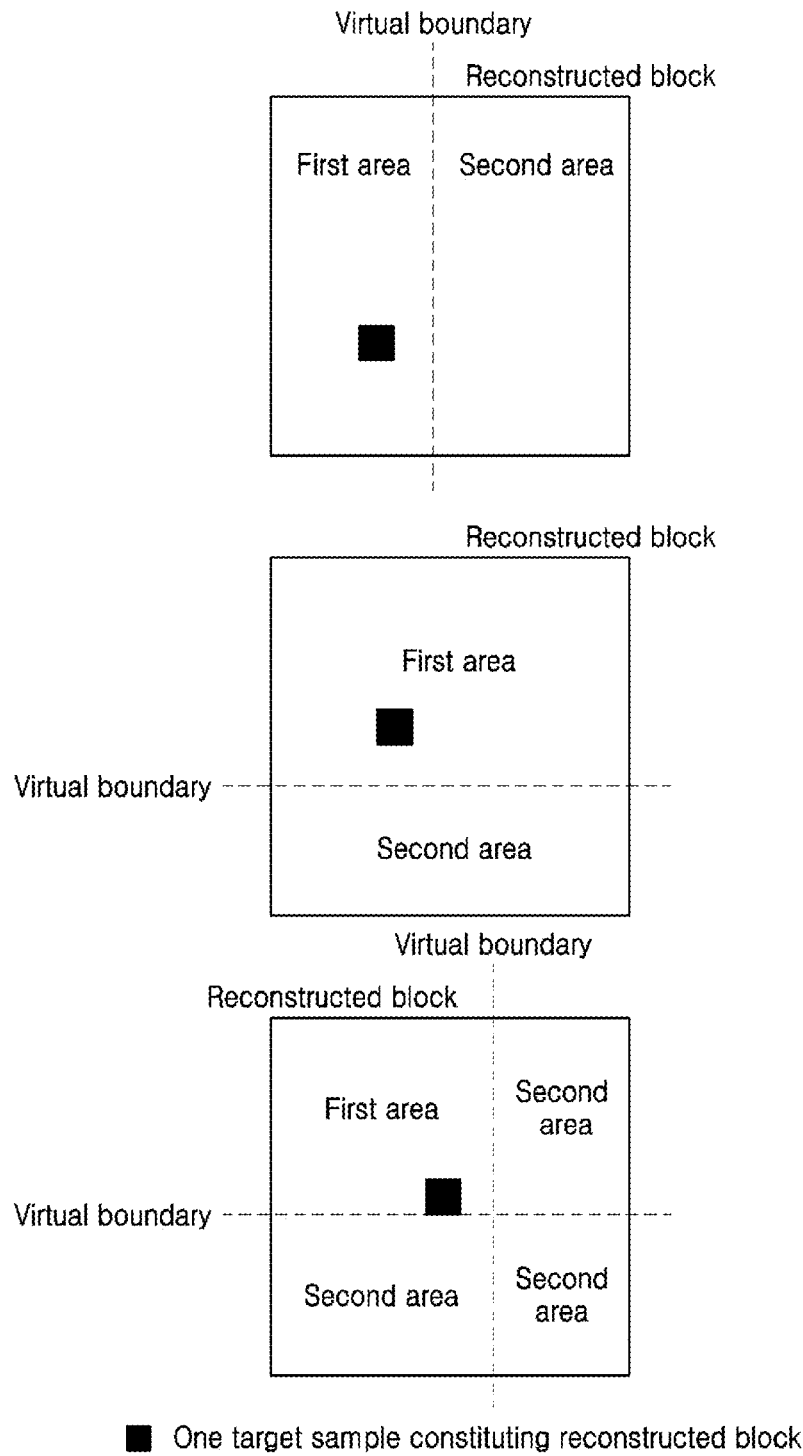
FIG. 8 is an exemplary diagram illustrating an area including a sample and an area not including the sample based on a virtual boundary for one sample constituting a restoration block.

As illustrated in FIG. 8, based on the adjacent vertical virtual boundary and/or the adjacent horizontal virtual boundary set for one target sample constituting the reconstructed block, the reconstructed block (or the picture, tile, or slice including the reconstructed block) may be split into an area (hereinafter, referred to a first area) including the target sample and an area (hereinafter, referred to as a second area) not including the target sample. The loop filter unit 560 may perform the ALF 566 for the target sample by using only the sample included in the first area. In this case, when a sample position belonging to the second area is required for the ALF, the sample of the required position may be padded by using a neighboring sample included in the first area in the process of operating the ALF 566.

The loop filter unit 180 of the video encoding apparatus may also constrain, on the virtual boundary, the operation of the in-loop filter including the deblocking filter 182, the SAO filter 184, and the ALF 186 as described above by using the same scheme as the video decoding apparatus.

Meanwhile, when the positional information of the vertical virtual boundary, pps_virtual_boundaries_pos_x[i] and the positional information of the horizontal virtual boundary, pps_virtual_boundaries_pos_y[i] are used, the number of signaled bits may increase as the size of the frame increases.

In the present disclosure, in order to reduce the amount of the virtual boundary information, the position of the i-th virtual boundary may be expressed by using a difference from a previous position. As illustrated in Table 5, the video encoding apparatus may replace the syntax elements pps_virtual_boundaries_pos_x[i] and pps_virtual_boundaries_pos_y[i] with differential positional information of the vertical virtual boundary, pps_virtual_boundaries_pos_x_delta[i] and differential positional information of the horizontal virtual boundary, pps_virtual_boundaries_pos_y_delta[i], and signal the differential positional information.

The video decoding apparatus may calculate a position of the i-th vertical virtual boundary PpsVirtualBoundariesPosX[i] by the unit of the luma sample by using the differential positional information of the vertical virtual boundary. The position of the i-th vertical virtual boundary is derived as illustrated in Equation 3.

$$PpsVirtualBoundariesPosX[i] = \text{pps\_virtual\_boundaries\_pos\_x\_delta}[i] \times 8, \; i = 0$$

$$PpsVirtualBoundariesPosX[i] = \text{pps\_virtual\_boundaries\_pos\_x\_delta}[i] \times 8 + PpsVirtualBoundariesPosX[i-1], \; i \neq 0$$

[Equation 3]

A bit number used for representing the differential positional information of the vertical virtual boundary is Ceil (Log 2(pic_width_in_luma_samples)−3). Further, a range of the differential positional information of the vertical virtual boundary is from 1 to Ceil((pic_width_in_luma_samples−PpsVirtualBoundariesPosX[i−1])×8)−2.

The video decoding apparatus may calculate a position of an i-th horizontal virtual boundary PpsVirtualBoundariesPosY[i] by the unit of the luma sample by using the differential positional information of the horizontal virtual boundary. The position of the i-th horizontal virtual boundary is derived as illustrated in Equation 4.

$$PpsVirtualBoundariesPosY[i] = \text{pps\_virtual\_boundaries\_pos\_y\_delta}[i] \times 8, \; i = 0$$

$$PpsVirtualBoundariesPosY[i] = \text{pps\_virtual\_boundaries\_pos\_y\_delta}[i] \times 8 + PpsVirtualBoundariesPosY[i-1], \; i \neq 0$$

[Equation 4]

A bit number used for representing the differential positional information of the horizontal virtual boundary is Ceil (Log 2(pic_height_in_luma_samples)−3). Further, a range of the differential positional information of the horizontal virtual boundary is from 1 to Ceil((pic_height_in_luma_samples−PpsVirtualBoundariesPosY[i−1])×8)−2.

In another embodiment according to the present disclosure, in order to reduce the amount of the virtual boundary

TABLE 5

|  | Descriptor |
|---|---|
| pic_parameter_set_rbsp( ) { | |
| ... | |
|    pps_loop_filter_across_virtual_boundaries_disabled_flag | u(1) |
|    if( pps_loop_filter_across_virtual_boundaries_disabled_flag) { | |
|      pps_num_ver_virtual_boundaries | u(2) |
|      for( i = 0; i < pps_num_ver_virtual_boundaries; i++ ) | |
|         pps_virtual_boundaries_pos_x_delta[ i ] | u(v) |
|      pps_num_hor_virtual_boundaries | u(2) |
|      for( i = 0; i < pps_num_hor_virtual_boundaries; i++ ) | |
|         pps_virtual_boundaries_pos_y_delta[ i ] | u(v) |
|    } | |
| ... | |
| } | | information, a vertical or horizontal uniform spacing flag may be signaled for indicating that the virtual boundaries are located at a uniform spacing. Syntax elements of the vertical or horizontal uniform spacing flag signaled from the video encoding apparatus are illustrated in Table 6.

TABLE 6

|  | Descriptor |
|---|---|
| pic_parameter_set_rbsp( ) { | |
| ... | |
|    pps_loop_filter_across_virtual_boundaries_disabled_flag | u(1) |
|    if( pps_loop_filter_across_virtual_boundaries_disabled_flag ) { | |
|      pps_num_ver_virtual_boundaries | u(2) |
|      pps_ver_virtual_boundaries_uniform_spacing_flag | u(1) |
|      If( !pps_ver_virtual_boundaries_uniform_spacing_flag ) | |
|        for( i = 0; i < pps_num_ver_virtual_boundaries; i++ ) | |
|          pps_virtual_boundaries_pos_x[ i ] | u(v) |
|      pps_num_hor_virtual_boundaries | u(2) |
|      pps_hor_virtual_boundaries_uniform_spacing_flag | u(1) |
|      If( !pps_hor_virtual_boundaries_uniform_spacing_flag ) | |
|        for( i = 0; i < pps_num_hor_virtual_boundaries; i++ ) | |
|          pps_virtual_boundaries_pos_y[ i ] | u(v) |
|    } | |
| ... | |
| } | |

When a vertical uniform spacing flag pps_ver_virtual_boundaries_uniform_spacing_flag is 1, the vertical virtual boundaries are uniformly distributed in one frame or picture. The video encoding apparatus signals the number of vertical virtual boundaries, pps_num_ver_virtual_boundaries to calculate the vertical uniform spacing. When the vertical uniform spacing flag is 1, the video decoding apparatus may derive the position of the vertical virtual boundary as illustrated in Equation 5.

$$PpsVirtualBoundariesPosX[i] = (i+1) \times (\text{pic\_width\_in\_luma\_sample} / (\text{pps\_num\_ver\_virtual\_boundaries} + 1)),$$

$$i = 0, \ldots , \text{pps\_num\_ver\_virtual\_boundaries} - 1$$

[Equation 5]

Meanwhile, when the vertical uniform spacing flag is 0, the video decoding apparatus decodes the positional information of the vertical virtual boundaries, virtual_boundaries_pos_x[i]. The positions of the vertical virtual boundaries may be derived by using the positional information of the vertical virtual boundaries as illustrated in Equation 1.

Further, when a horizontal uniform spacing flag pps_hor_virtual_boundaries_uniform_spacing_flag is 1, the horizontal virtual boundaries are uniformly distributed in one frame or picture. The video encoding apparatus signals the number of horizontal virtual boundaries, pps_num_hor_virtual_boundaries to calculate the horizontal uniform spacing. When the horizontal uniform spacing flag is 1, the video decoding apparatus may derive horizontal virtual boundary position as illustrated in Equation 6.

$$PpsVirtualBoundariesPosY[i] = (i+1) \times (\text{pic\_height\_in\_luma\_sample} / (\text{pps\_num\_hor\_virtual\_boundaries} + 1)),$$

$$i = 0, \ldots , \text{pps\_num\_hor\_virtual\_boundaries} - 1$$

[Equation 6]

Meanwhile, when the horizontal uniform spacing flag is 0, the video decoding apparatus may decode the positional information of the horizontal virtual boundaries, virtual_boundaries_pos_y[i]. The position of the horizontal virtual boundaries may be derived by using the positional information of the horizontal virtual boundaries as illustrated in Equation 2.

As described above, the positional information of the vertical virtual boundaries and the horizontal virtual boundaries may be expressed by a positive integer of 0 or more by using a fixed-length bit.

In another embodiment according to the present disclosure, by mixing the method using the differential positional information of the virtual boundaries illustrated in Table 5 and the method using the uniform spacing flag illustrated in Table 6, the video encoding apparatus may signal the virtual boundary information as illustrated in Table 7.

TABLE 7

|  | Descriptor |
|---|---|
| pic_parameter_set_rbsp( ) { | |
| ... | |
|    pps_loop_filter_across_virtual_boundaries_disabled_flag | u(1) |
|    if( pps_loop_filter_across_virtual_boundaries_disabled_flag ) { | |
|      pps_num_ver_virtual_boundaries | u(2) |
|      pps_ver_virtual_boundaries_uniform_spacing_flag | u(1) |
|      If( !pps_ver_virtual_boundaries_uniform_spacing_flag ) | |
|        for( i = 0; i < pps_num_ver_virtual_boundaries; i++ ) | |
|          pps_virtual_boundaries_pos_x_delta[ i ] | u(v) |
|      pps_num_hor_virtual_boundaries | u(2) |
|      pps_hor_virtual_boundaries_uniform_spacing_flag | u(1) |

TABLE 7-continued

| | Descriptor |
|---|---|
| `If( !pps_hor_virtual_boundaries_uniform_spacing_flag )`<br>    `for( i = 0; i < pps_num_hor_virtual_boundaries; i++ )`<br>        `pps_virtual_boundaries_pos_y_delta[ i ]`<br>  `}`<br>`...`<br>`}` | u(v) |

Here, when the uniform spacing flag is 1, the positions of the vertical and horizontal virtual boundaries are calculated as illustrated in Equations 5 and 6. On the contrary, when the uniform spacing flag is 0, the positions of the vertical and horizontal virtual boundaries may be calculated as illustrated in Equations 3 and 4.

Hereinafter, a method for displaying the virtual boundary according to a 360-degree video projection and packing scheme will be described. First, a method for displaying the virtual boundary when the CMP is used is described.

As illustrated in Table 1, a CMP packing scheme cmp_packing_type, and the resulting packing type packing_type and position index position_index are defined in advance. The packing type of the current frame may be transmitted on the SPS or PPS or transmitted by using a supplemental enhancement information (SEI) message. For example, a cubemap projection SEI message may be defined and used.

Table 8 illustrates a syntax for the cube map projection SEI message signaled by the video encoding apparatus.

TABLE 8

| | Descriptor |
|---|---|
| `cube_packing( ) {` | |
|   `360_video_gemetry_type` | u(3) |
|   `If( 360_video_gemetry_type == FORMAT_360_PARCMP ) {` | |
|     `For( i=0; 1 < num_cube_face_equal_to_6; i++ ) {` | |
|       `unit_face_idx[ i ]` | u(3) |
|       `coded_face_width[ i ]` | u(16) |
|       `coded_face_height[ i ]` | u(16) |
|       `coded_face_top[ i ]` | u(16) |
|       `coded_face_left[ i ]` | u(16) |
|       `coded_face_transform_type[ i ]` | u(3) |
|     `}` | |
|   `SPAF_num_coeffs` | ue(v) |
|   `SPAF_num_divisor` | ue(v) |
|   `For(i=0; i < SPAF-num_coeffs; i++ )` | |
|     `SPAF_num_dividend[ i ]` | ue(v) |
|   `}` | |
| `}` | |

Here, 360_video_geometry_type[i] represents a type of a cube map. unit_face_idx[i] represents an index of each face, and coded_face_width[i], coded_face_height[i], coded_face_top[i], and coded_face_left[i] represent the width and the height of each face, a position of a top sample and a position of a left sample of the corresponding face, respectively.

cube_face_transform_type[i] may represent rotation or mirroring of the corresponding face, and may be defined as illustrated in Table 9.

TABLE 9

| Value | Description |
|---|---|
| 0 | no transform |
| 1 | mirroring horizontally |
| 2 | rotation by 180 degrees(anticlockwise) |
| 3 | rotation by 180 degrees(anticlockwise) before mirroring horizontally |
| 4 | rotation by 90 degrees(anticlockwise) before mirroring horizontally |
| 5 | rotation by 90 degrees(anticlockwise) |
| 6 | rotation by 270 degrees(anticlockwise) before mirroring horizontally |
| 7 | rotation by 270 degrees(anticlockwise) |

Meanwhile, in Table 8, SPAF_num_coeffs represents the number of transform coefficients required for mapping to a 2D face from a 3D sphere, SPAF_coeffs_divisor represents a divisor required for calculating the transform coefficient, and SPAF_coeffs_divident[i] represents a dividend required for calculating the transform coefficient. The transform coefficient may be derived as in Equation 7 by using them.

$$\text{SPAF\_coefficient}[i] = \text{SPAF\_coeffs\_divident}[i] / \text{SPAF\_coeffs\_divisor}, i=0, \ldots, \text{SPAF\_num\_coeffs}-1 \quad \text{[Equation 7]}$$

Hereinafter, when cmp_packing_type equal to 0 is signaled before receiving the PPS, an operation which the loop filter unit 560 performs by using the syntax illustrated in Table 8 will be described.

In this case, since there is no vertical virtual boundary, the loop filter unit 560 sets the number of vertical virtual boundaries, pps_num_ver_virtual_boundaries equal to 0. Further, since the horizontal virtual boundaries are present at a uniform spacing every ⅙ of a frame height, the loop filter unit 560 may set the number of horizontal virtual boundaries, pps_num_hor_virtual_boundaries to 5, set the virtual boundary positions as the positions of the horizontal virtual boundaries, PpsVirtualBoundariesPosY[i], and then constrain the use of the in-loop filter on the corresponding position.

Next, when cmp_packing_type is equal to 1, an operation which the loop filter unit 560 performs by using the syntax illustrated in Table 8 will be described.

In this case, since the vertical virtual boundary is present at a uniform spacing every ½ of a frame width and the virtual boundary of the horizontal direction is present at a uniform spacing every ⅓ of a frame height, the loop filter unit 560 may set the number of vertical virtual boundaries to 1 and set the number of horizontal virtual boundaries to 2, set PpsVirtualBoundariesPosX[i] and PpsVirtualBoundariesPosY[i] using the resulting virtual boundary positions, and then constrain the use of the in-loop filter on the corresponding position.

As described above, the loop filter unit 560 may determine the number of vertical virtual boundaries, the number of horizontal virtual boundaries, the position of the vertical virtual boundary, and the position of the horizontal virtual boundary based on the received cmp_packing_type. In this case, the position of the vertical virtual boundary and the position of the horizontal virtual boundary may be calculated by using the positional information of the vertical virtual boundary pps_virtual_boundaries_pos_x[i] and the positional information of the horizontal virtual boundary pps_virtual_boundaries_pos_y[i] as illustrated in Equation 8.

$$\text{PpsVirtualBoundariesPos}[i] = \text{pps\_virtual\_boundaries\_pos\_}y[i] \times K$$

$$\text{PpsVirtualBoundariesPos}X[i] = \text{pps\_virtual\_boundaries\_pos\_}x[i] \times K \quad \text{[Equation 8]}$$

Here, K may be 8 or 4. Alternatively, K may be a minimum CU block size or a minimum transform block size. Alternatively, K may be a value signaled from the video encoding apparatus or determined according to cmp_packing_type and the projection type.

Meanwhile, K may be one or more values. For example, when the size of the frame packed in the CMP is different, each frame may have a different K value. When the size of the packed frame is not equal, the number of vertical virtual boundaries and the number of horizontal virtual boundaries may be inferred according to cmp_packing_type, but the positional information of the vertical and horizontal virtual boundaries may be signaled with the value thereof expressed by the positive integer of 0 or more by using the fixed-length bit. The position of the vertical virtual boundary and the position of the horizontal virtual boundary may be derived by using the signaled positional information.

Based on the position of the vertical and horizontal virtual boundaries derived as described above, the loop filter unit 560 may constrain, on the virtual boundaries, the operation of at least one of the deblocking filter 562, the SAO filter 564, and the ALF 566 which are the in-loop filters. Since the scheme of constraining the operation of the in-loop filter on the virtual boundary is pre-described by using Tables 3 and 4, and Equations 1 and 2, a further description will be omitted.

Figure 9:
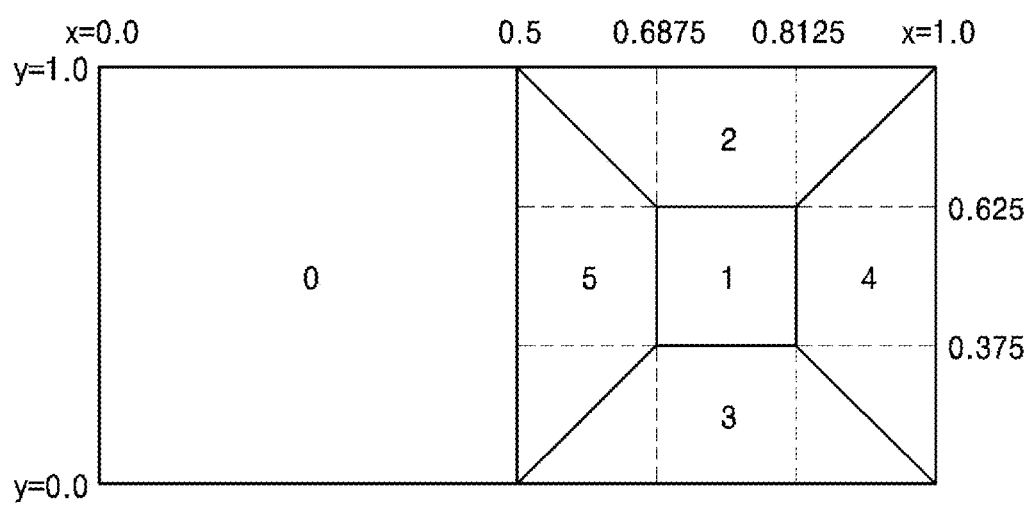
FIG. 9 is an exemplary diagram illustrating a TSP format which is the projection format for the 360-degree video.
Figure 10:
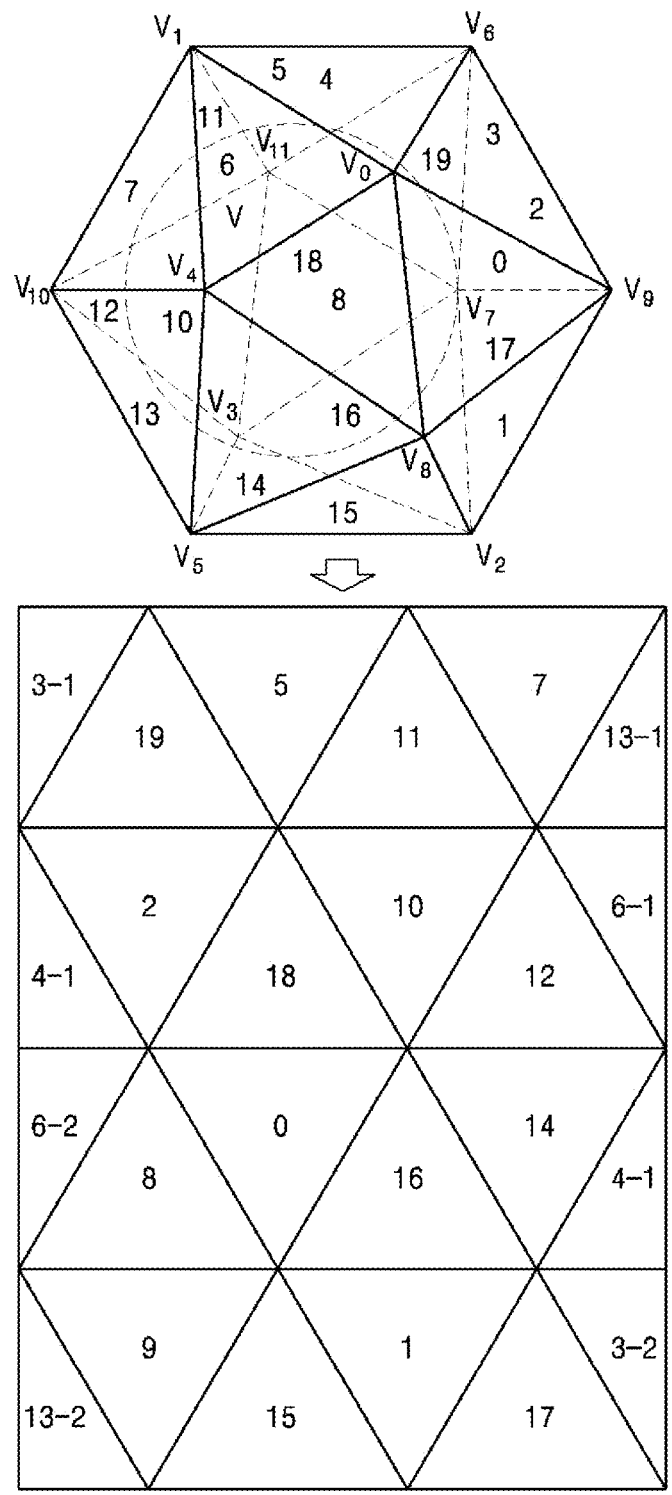
FIG. 10 is an exemplary diagram illustrating an ISP format which is the projection format for the 360-degree video.

Meanwhile, when the CMP is not used, i.e., when the packed face is not a rectangle having the same size, it may be difficult to define the virtual boundary only by the positional information of the vertical and horizontal virtual boundaries. For example, a truncated square pyramid projection (TSP) format illustrated in FIG. 9, a view of the front face is relatively packet to be large, and transmitted with index #0 and the remaining view is transmitted in a smaller rectangular or trapezoidal form. As another example, in an icosahedron projection (ISP) format illustrated in FIG. 10, a triangular tile is transmitted.

In such an example, it is difficult to define the virtual boundary using the positional information of the vertical and horizontal virtual boundaries. Accordingly, in the case of the TSP, the video encoding apparatus may signal the syntax elements illustrated in Table 10.

TABLE 10

```
pic_parameter_set_rbsp( ) {
  ...
  pps_loop_filter_across_virtual_boundaries_disabled_flag
  if( pps_loop_filter_across_virtual_boundaries_disabled_flag ) {
    pps_num_face
    for( i = 0; i < pps_num_face; i++ )
      for( j = 0; j < 4; j++ )
        pps_vertex_pos_x[ i ][ j ]
  }
  ...
}
```

Here, pps_num_face represents the number of packed faces, and since the total number of packed faces is 6 in the case of the TSP, i expressing the index of each face has a value of 0 to 5. Further, pps_vertex_pos_x[i][j] and pps_vertex_pos_y[i][j] represent vertex coordinates of each face, and in the case of the TSP, since each face is a quadrangle having four vertexes, j expressing the index of each vertex has a value of 0 to 3.

Meanwhile, in the case that each face has a triangular shape, e.g., the ISP, the video encoding apparatus may signal the syntax elements so that j has a value of 0 to 2 as illustrated in Table 11.

TABLE 11

```
pic_parameter_set_rbsp( ) {
  ...
  pps_loop_filter_across_virtual_boundaries_disabled_flag
  if( pps_loop_filter_across_virtual_boundaries_disabled_flag ) {
    pps_num_face
    for( i = 0; i < pps_num_face; i++ )
      for( j = 0; j < 2; j++ )
        pps_vertex_pos_x[ i ][ j ]
        pps_vertex_pos_y[ i ][ j ]
  }
  ...
}
```

Instead of fixing the maximum value of j such as Table 10 or 11, the video encoding apparatus may signal a syntax element such as pps_num_vertex representing the number of vertexes constituting each face.

The loop filter unit 560 may receive pps_vertex_pos_x[i][j] and pps_vertex_pos_y[i][j], and derive a set of coordinates of points for connecting between vertexes in the frame, PpsVirtualBoundariesPosXY[x][y], by using a linear equation connecting the received vertexes. The loop filter unit 560 may constrain the operation of the in-loop filter on the derived positions.

The video encoding apparatus according to the present disclosure may signal a non-packing constraint flag, general_non_packed_constraint_flag. The flag having a value of 1 indicates that a decoded bitstream is suitable for expressing an output video split into the frame, and the flag having a value of 0 indicates that additional processing may be required.

The video encoding apparatus may control the in-loop filter constraint flag pps_loop_filter_across_virtual_boundaries_disabled_flag by using the non-packing constraint flag.

When the non-packing constraint flag is 1, there is no packed video, and accordingly the additional processing is not required. Therefore, no related syntax elements for processing the virtual boundary need to be transmitted. For example, the in-loop filter constraint flag may be set to 0.

When the non-packing constraint flag is 0, there may be the packed video, and accordingly the additional processing is required. In this case, it is all possible that the in-loop filter constraint flag is set to 0 or 1. As an example when the non-packing constraint flag is 0 but the in-loop filter constraint flag is 0, a packing type not using the rectangle may be used.

Figure 11:
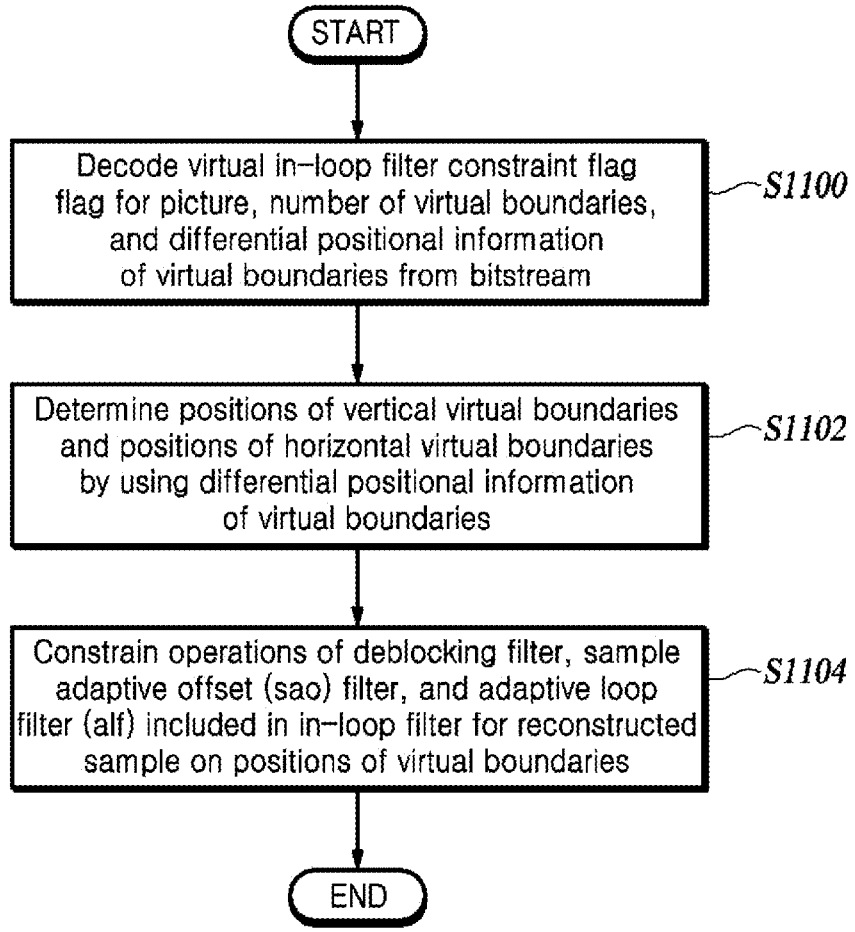
FIG. 11 is a schematic flowchart of a method for constraining an operation of an in-loop filter according to an embodiment of the present disclosure.

FIG. 11 is a schematic flowchart of a method for constraining an operation of an in-loop filter according to an embodiment of the present disclosure.

The video decoding apparatus may constrain the operation of the in-loop filter as follows by processing the virtual boundary which is present in one or more pictures.

The video decoding apparatus decodes the in-loop filter constraint flag for the picture, the number of virtual boundaries, and differential positional information of the virtual boundaries from the bitstream (S1100). Here, the virtual boundaries includes the vertical virtual boundary and the horizontal virtual boundary.

When the in-loop filter constraint flag is 1, the video decoding apparatus may deactivate the in-loop filter on the virtual boundary in the picture and when the in-loop filter constraint flag is 0, the video decoding apparatus may apply the in-loop filter. Further, when the in-loop filter constraint flag is not signaled on the bitstream, the in-loop filter constraint flag may be set to 0.

When the number of vertical virtual boundaries s not signaled on the bitstream, the number of vertical virtual boundaries may be set to 0 and when the number of horizontal virtual boundaries is not signaled on the bitstream, the number of horizontal virtual boundaries may be set to 0.

The video decoding apparatus determines positions of the vertical virtual boundaries and positions of the horizontal virtual boundaries by using the differential positional information of the virtual boundaries (S1102).

As illustrated in Equation 3, the video decoding apparatus determines the positions of the vertical virtual boundaries by using the differential positional information of the vertical virtual boundaries and the position of the vertical virtual boundary of the previous index. Further, as illustrated in Equation 4, the video decoding apparatus may determine the positions of the horizontal virtual boundaries by using the differential positional information of the horizontal virtual boundaries and the position of the horizontal virtual boundary of the previous index.

The video decoding apparatus constrains, for the reconstructed sample on the positions of the virtual boundary, operation of at least one of a deblocking filter, a sample adaptive offset (SAO) filter, and an adaptive loop filter (ALF) which are included in the in-loop filter (S1104).

Since the scheme of constraining the operation of the in-loop filter on the virtual boundary is pre-described by using Tables 3 and 4, and Equations 1 and 2, a further description will be omitted.

Figure 12:
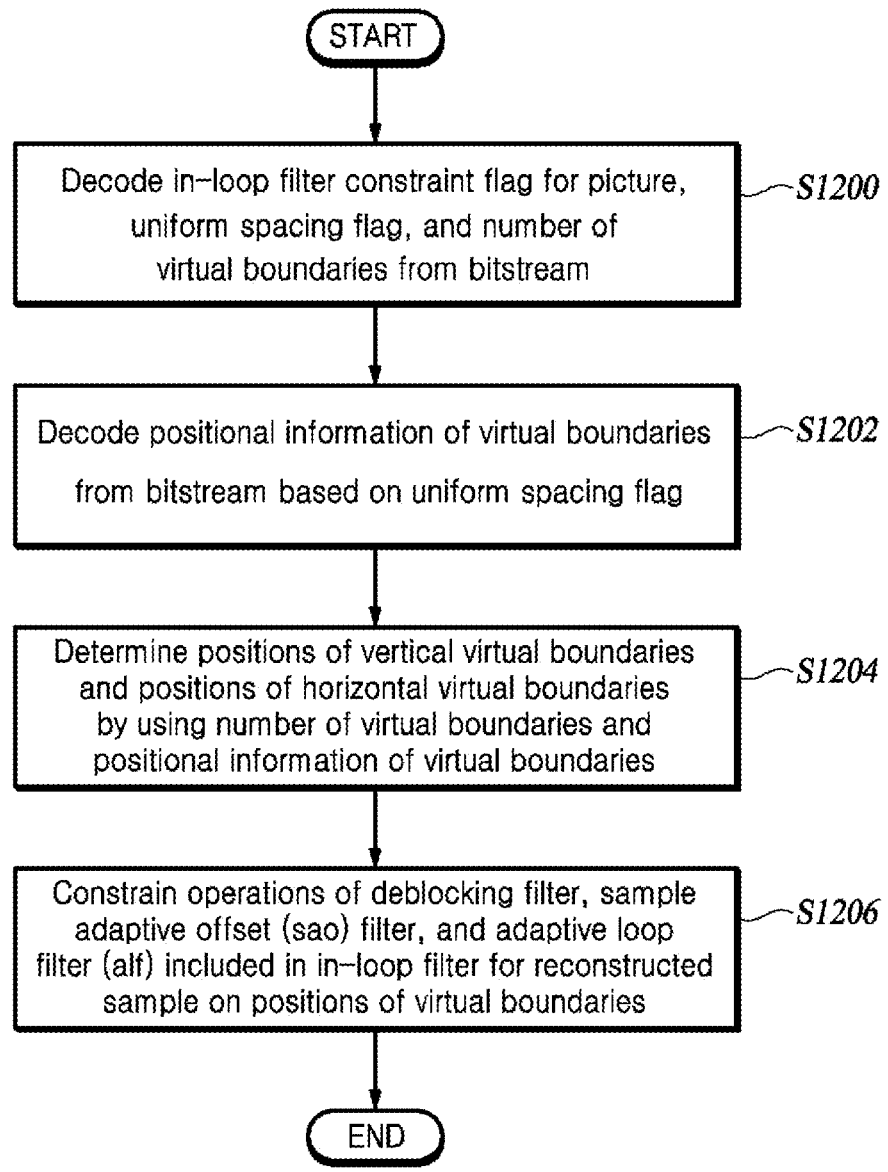
FIG. 12 is a schematic flowchart of a method for constraining an operation of an in-loop filter according to another embodiment of the present disclosure.

FIG. 12 is a schematic flowchart of a method for restricting an operation of an in-loop filter according to another embodiment of the present disclosure.

The video decoding apparatus may constrain the operation of the in-loop filter as follows by processing the virtual boundary which is present in one or more pictures.

The video decoding apparatus decodes the in-loop filter constraint flag for the picture, the uniform spacing flag, and the number of virtual boundaries from the bitstream (S1200). Here, the uniform spacing flag includes a vertical uniform spacing flag and a horizontal uniform spacing flag, and the virtual boundary includes a vertical virtual boundary and a horizontal virtual boundary.

When the in-loop filter constraint flag is 1, the video decoding apparatus may deactivate the in-loop filter on the virtual boundary in the picture and when the in-loop filter constraint flag is 0, the video decoding apparatus may apply the in-loop filter.

The video decoding apparatus decodes positional information of the virtual boundaries from the bitstream based on the uniform spacing flag (S1202).

The video decoding apparatus may decode positional information of the vertical virtual boundary when the vertical uniform spacing flag is 0 and decode positional information of the horizontal virtual boundary when the horizontal uniform spacing flag is 0.

The video decoding apparatus determines positions of the vertical virtual boundaries and positions of the horizontal virtual boundaries by using the number of virtual boundaries and the positional information of the virtual boundaries (S1204).

The video decoding apparatus determines the positions of the vertical virtual boundaries by using the number of vertical virtual boundaries and a width of a current picture as illustrated in Equation 5 when the vertical uniform spacing flag is 1. Further, the video decoding apparatus may determine the positions of the horizontal virtual boundaries by using the number of horizontal virtual boundaries and a height of the current picture as illustrated in Equation 6 when the horizontal uniform spacing flag is 1.

Meanwhile, the video decoding apparatus determines the positions of the vertical virtual boundaries by using the number of vertical virtual boundaries and the positional information of the vertical virtual boundaries as illustrated in Equation 1 when the vertical uniform spacing flag is 0. Further, the video decoding apparatus determines the positions of the horizontal virtual boundaries by using the number of horizontal virtual boundaries and the positional information of the horizontal virtual boundaries as illustrated in Equation 2 when the vertical uniform spacing flag is 0.

The video decoding apparatus constrains the operation of at least one of a deblocking filter, a sample adaptive offset (SAO) filter, and an adaptive loop filter (ALF) included in the in-loop filter for the reconstructed sample on the positions of the virtual boundary (S1206).

Figure 13:
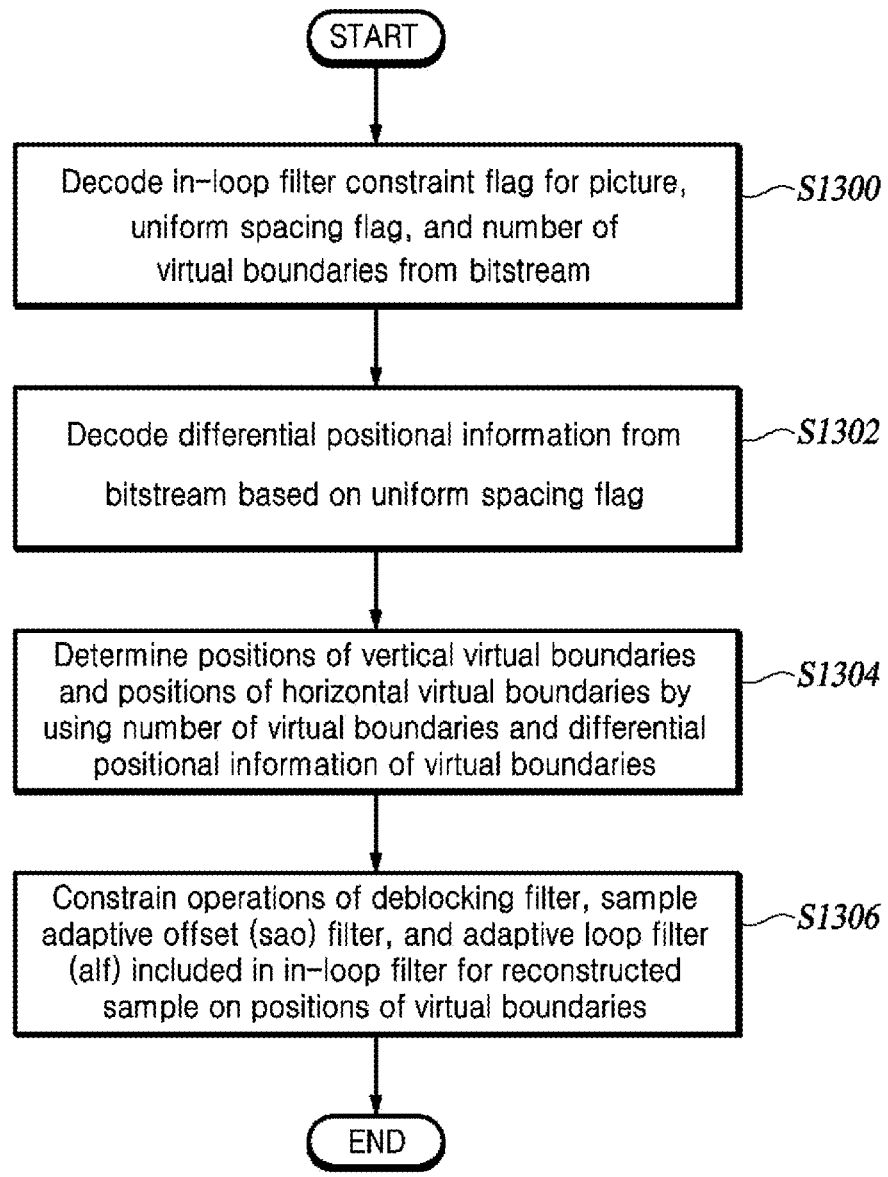
FIG. 13 is a schematic flowchart of a method for constraining an operation of an in-loop filter according to yet another embodiment of the present disclosure.

FIG. 13 is a schematic flowchart of a method for constraining an operation of an in-loop filter according to yet another embodiment of the present disclosure.

The video decoding apparatus may constrain the operation of the in-loop filter as follows by processing the virtual boundary which is present in one or more pictures.

The video decoding apparatus decodes the in-loop filter constraint flag for the picture, the uniform spacing flag, and the number of virtual boundaries from the bitstream (S1300). Here, the uniform spacing flag includes a vertical uniform spacing flag and a horizontal uniform spacing flag, and the virtual boundary includes a vertical virtual boundary and a horizontal virtual boundary.

When the in-loop filter constraint flag is 1, the video decoding apparatus may deactivate the in-loop filter on the virtual boundary in the picture and when the in-loop filter constraint flag is 0, the video decoding apparatus may apply the in-loop filter.

The video decoding apparatus decodes differential positional information of the virtual boundaries from the bitstream based on the uniform spacing flag (S1302).

The video decoding apparatus may decode differential positional information of the vertical virtual boundary when the vertical uniform spacing flag is 0 and decode differential positional information of the horizontal virtual boundary when the horizontal uniform spacing flag is 0.

The video decoding apparatus determines positions of the vertical and horizontal virtual boundaries by using the number of virtual boundaries and the differential positional information of the virtual boundaries (S1304).

The video decoding apparatus determines the positions of the vertical virtual boundaries by using the number of vertical virtual boundaries and a width of a current picture as illustrated in Equation 5 when the vertical uniform spacing flag is 1. Further, the video decoding apparatus may determine the positions of the horizontal virtual boundaries by using the number of horizontal virtual boundaries and a height of the current picture as illustrated in Equation 6 when the horizontal uniform spacing flag is 1.

Meanwhile, the video decoding apparatus determines the positions of the vertical virtual boundaries by using the number of vertical virtual boundaries and the differential positional information of the vertical virtual boundaries as illustrated in Equation 3 when the vertical uniform spacing flag is 0. Further, the video decoding apparatus determines the positions of the horizontal virtual boundaries by using the number of horizontal virtual boundaries and the differential positional information of the horizontal virtual boundaries as illustrated in Equation 4 when the vertical uniform spacing flag is 0.

The video decoding apparatus constrains, for the reconstructed sample on the positions of the virtual boundary, the operation of at least one of a deblocking filter, a sample adaptive offset (SAO) filter, and an adaptive loop filter (ALF) included in the in-loop filter (S1306).

As described above, according to the embodiment, the method for signaling the virtual boundary information depending on the frame packing and constraining the operation of the in-loop filter on the virtual boundary by using the boundary information to prevent the performance deterioration which may occur when applying the in-loop filter to the virtual boundary.

In each flowchart according to the embodiment, it is described that respective processes are executed in sequence, but the present disclosure is not limited thereto. In other words, since it is applicable that the processes described in the flowchart are changed and executed or one or more processes are executed in parallel, the flowchart is not limited to a time series order.

Meanwhile, various functions or methods described in the present disclosure may also be implemented by instructions stored in a non-transitory recording medium which may be read and executed by one or more processors. The non-transitory recording medium includes, for example, all types of recording devices storing data in a form readable by a computer system. For example, the non-transitory recording medium includes storage media such as an erasable programmable read only memory (EPROM), a flash drive, an optical driver, a magnetic hard drive, and a solid state drive (SSD).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

DETAILED DESCRIPTION OF MAIN ELEMENTS

| | |
|---|---|
| 155: Entropy encoder | 170: Adder |
| 180: Loop filter | 182: Deblocking filter |
| 184: SAO filter | 186: ALF |
| 510: Entropy decoder | 550: Adder |
| 560: Loop filter | 562: Deblocking filter |
| 564: SAO filter | 566: ALF |

What is claimed is:

1. A method for processing a virtual boundary which is present in one or more pictures, which is performed by a video decoding apparatus, the method comprising:
decoding virtual boundary information including a uniform spacing flag and a number of virtual boundaries from a bitstream, wherein the uniform spacing flag includes a vertical uniform spacing flag and a horizontal uniform spacing flag, and the virtual boundaries include vertical virtual boundaries and horizontal virtual boundaries;
decoding differential positional information of the virtual boundaries from the bitstream based on the uniform spacing flag; and
determining positions of the vertical virtual boundaries and positions of the horizontal virtual boundaries by using the virtual boundary information or the differential positional information, wherein when a horizontal coordinate of a target sample to be filtered coincides with a position that precedes a position of a vertical virtual boundary, among the vertical virtual boundaries, by one index, sample adaptive offset (SAO) filtering in a direction other than a vertical direction is constrained for the target sample.

2. The method of claim 1, further comprising:
decoding, from the bitstream, an in-loop filter constraint flag indicating whether to constrain in-loop filtering for the virtual boundaries within the one or more pictures, wherein the virtual boundary information is decoded from the bitstream when the in-loop filter constraint flag indicates that the in-loop filtering is constrained.

3. The method of claim 2, further comprising:
constraining, for reconstructed samples on the positions of the virtual boundaries, the in-loop filtering including at least one of deblocking filtering, the SAO filtering, and adaptive loop filtering (ALF) when the in-loop filter constraint flag indicates that the in-loop filtering is constrained.

4. The method of claim 1, wherein when the vertical uniform spacing flag is 1, the positions of the vertical virtual boundaries are determined by using a number of the vertical virtual boundaries and a width of the picture.

5. The method of claim 1, wherein when the horizontal uniform spacing flag is 1, the positions of the horizontal virtual boundaries are determined by using a number of the horizontal virtual boundaries and a height of the picture.

6. The method of claim 1, wherein:
when the vertical uniform spacing flag is 0, the positions of the vertical virtual boundaries are determined by using a number of the vertical virtual boundaries and the differential positional information of the vertical virtual boundaries and when the horizontal uniform spacing flag is 0, the positions of the horizontal virtual boundaries are determined by using a number of the horizontal virtual boundaries and the differential positional information of the horizontal virtual boundaries.

7. The method of claim 3, wherein:

when the horizontal coordinate of the target sample to be filtered coincides with one of the positions of the vertical virtual boundaries, the deblocking filtering in a horizontal direction for the target sample is constrained, or when a vertical coordinate of the target sample coincides with one of the positions of the horizontal virtual boundaries, the deblocking filtering in the vertical direction for the target sample is constrained.

8. The method of claim 3, wherein when a vertical coordinate of the target sample to be filtered coincides with one of the positions of the horizontal virtual boundaries or positions precedent to a position of each horizontal virtual boundary by one, the SAO filtering in a direction other than a horizontal direction is constrained for the target sample.

9. The method of claim 3, wherein one of the positions of the vertical virtual boundaries which is closest to the horizontal coordinate of the target sample to be filtered is set as an adjacent vertical virtual boundary, and one of the positions of the horizontal virtual boundary which is closest to a vertical coordinate of the target sample is set as an adjacent horizontal virtual boundary.

10. The method of claim 9, wherein a first area including the target sample and a second area not including the target sample are split based on the adjacent vertical virtual boundary and/or the adjacent horizontal virtual boundary, and the ALF is performed for the target sample by using samples included in the first area, wherein, when a sample position belonging to the second area is required for the ALF, a sample of the required position is padded by using a neighboring sample included in the first area.

11. A video decoding apparatus comprising:

an entropy decoder configured to:

decode virtual boundary information including a uniform spacing flag and a number of virtual boundaries which are present in one or more pictures from a bitstream, decode, from the bitstream, differential positional information of the virtual boundaries based on the uniform spacing flag, and decode, from the bitstream, residual signals for samples constituting the picture, wherein the uniform spacing flag includes a vertical uniform spacing flag and a horizontal uniform spacing flag, and the virtual boundaries includes vertical virtual boundaries and horizontal virtual boundaries;

an adder configured to reconstruct the samples by using residual samples generated from the residual signals and prediction samples for the samples; and a loop filter unit configured to determine positions of the vertical virtual boundaries and positions of the horizontal virtual boundaries by using the virtual boundary information or the differential positional information of the virtual boundaries, wherein the loop filter unit is configured to, when a horizontal coordinate of a target sample to be filtered coincides with a position that precedes a position of a vertical virtual boundary, among the vertical virtual boundaries, by one index, constrain sample adaptive offset (SAO) filtering in a direction other than a vertical direction for the target sample.

12. The video decoding apparatus of claim 11, wherein the entropy decoding unit is configured to decode, from the bitstream, an in-loop filter constraint flag indicating whether to constrain in-loop filtering for the virtual boundaries within the one or more pictures, wherein the virtual boundary information is decoded from the bitstream when the in-loop filter constraint flag indicates that in-loop filtering is constrained.

13. The video decoding apparatus of claim 12, wherein the loop filter unit is configured to constrain, for reconstructed samples on the positions of the virtual boundaries, the in-loop filtering including at least one of deblocking filtering, the SAO filtering, and adaptive loop filtering (ALF) when the in-loop filter constraint flag indicates that the in-loop filtering is constrained.

14. The video decoding apparatus of claim 11, wherein the loop filter unit is configured to, when the vertical uniform spacing flag is 1, determine the positions of the vertical virtual boundaries by using a number of the vertical virtual boundaries and a width of the picture.

15. The video decoding apparatus of claim 11, wherein the loop filter unit is configured to, when the horizontal uniform spacing flag is 1, determine the positions of the horizontal virtual boundaries by using a number of the horizontal virtual boundaries and a height of the picture.

16. The video decoding apparatus of claim 11, wherein the loop filter unit is configured to:

determine the positions of the vertical virtual boundaries by using a number of the vertical virtual boundaries and the differential positional information of the vertical virtual boundaries when the vertical uniform spacing flag is 0, and determine the positions of the horizontal virtual boundaries by using a number of the horizontal virtual boundaries and the differential positional information of the horizontal virtual boundaries when the horizontal uniform spacing flag is 0.

* * * * *